US008028231B2

(12) United States Patent  (10) Patent No.: US 8,028,231 B2
Jeffery et al.  (45) Date of Patent: Sep. 27, 2011

(54) DOCUMENT MANAGEMENT SYSTEM FOR SEARCHING SCANNED DOCUMENTS

(75) Inventors: Scott R. Jeffery, Westfield, NJ (US); Thomas A. Rizk, Franklin Lakes, NJ (US)

(73) Assignee: TractManager, Inc., Chattanooga, TN (US)

( * ) Notice: Subject to any disclaimer, the term of this patent is extended or adjusted under 35 U.S.C. 154(b) by 681 days.

(21) Appl. No.: 11/688,765

(22) Filed: Mar. 20, 2007

(65) Prior Publication Data

US 2008/0046417 A1 Feb. 21, 2008

Related U.S. Application Data

(63) Continuation of application No. 11/142,257, filed on Jun. 2, 2005, now Pat. No. 7,194,677, which is a continuation of application No. 09/748,105, filed on Dec. 27, 2000, now Pat. No. 6,957,384.

(51) Int. Cl.
*G06F 17/30* (2006.01)
(52) U.S. Cl. ............... 715/710; 715/776; 707/E17.008; 707/E17.114
(58) Field of Classification Search .................. 715/200, 715/205, 210, 236, 710, 716; 707/E17.008, 707/E17.114
See application file for complete search history.

(56) References Cited

U.S. PATENT DOCUMENTS

| | | |
|---|---|---|
| 4,977,906 A | 12/1990 | Di Scipio |
| 5,159,667 A | 10/1992 | Borrey et al. |
| 5,161,214 A * | 11/1992 | Addink et al. .............. 707/1 |
| 5,479,600 A | 12/1995 | Wroblewski et al. |
| 5,528,742 A | 6/1996 | Moore et al. |
| 5,581,682 A | 12/1996 | Anderson et al. |
| 5,598,557 A * | 1/1997 | Doner et al. .............. 707/5 |
| 5,623,679 A | 4/1997 | Rivette et al. |
| 5,623,681 A | 4/1997 | Rivette et al. |
| 5,666,490 A | 9/1997 | Gillings et al. |
| 5,669,007 A | 9/1997 | Tateishi |
| 5,726,884 A | 3/1998 | Sturgeon et al. |
| 5,748,805 A | 5/1998 | Withgott et al. |
| 5,774,357 A | 6/1998 | Hoffberg et al. |
| 5,850,490 A | 12/1998 | Johnson |
| 5,860,073 A | 1/1999 | Ferrel et al. |
| 5,870,770 A | 2/1999 | Wolfe |
| 5,875,108 A | 2/1999 | Hoffberg et al. |

(Continued)

OTHER PUBLICATIONS

Website http://tractmanager.com/, TractManager: Technology-Based Contract Management, Copyright 2000, TractManager LLC, p. 1 of 1, Apr. 5, 2001.

(Continued)

*Primary Examiner* — Stephen S Hong
*Assistant Examiner* — Marshon Robinson
(74) *Attorney, Agent, or Firm* — Perkins Coie LLP

(57) ABSTRACT

A method for storing, organizing and providing remote electronic access to documents. A cover sheet including a standard set of identification data characterizing each document is developed and stored. A digital version of each document is created and stored by scanning each contract. Each digital version includes a scanned image and a searchable text file, wherein the text is overlaid with the image. An index of bookmarks identifying sections of the digital version of each document is generated. Selected fields of information are captured from the digital version of the document. The documents are organized and cross-referenced in a database that includes the captured information and additional information related to each document. Designated parties are alerted of critical dates associated with each document. Remote electronic access to the documents is provided over the internet.

35 Claims, 44 Drawing Sheets

U.S. PATENT DOCUMENTS

| | | | |
|---|---|---|---|
| 5,892,845 A | | 4/1999 | Yamanaka et al. |
| 5,893,908 A | * | 4/1999 | Cullen et al. ............... 707/5 |
| 5,940,800 A | * | 8/1999 | Bennett et al. ............... 705/1 |
| 5,940,843 A | | 8/1999 | Zucknovich et al. |
| 5,960,448 A | | 9/1999 | Reichek et al. |
| 5,995,959 A | | 11/1999 | Friedman et al. |
| 5,999,664 A | * | 12/1999 | Mahoney et al. ............ 382/305 |
| 6,009,442 A | * | 12/1999 | Chen et al. ............... 715/205 |
| 6,100,890 A | | 8/2000 | Bates et al. |
| 6,144,975 A | | 11/2000 | Harris, Jr. et al. |
| 6,209,004 B1 | | 3/2001 | Taylor |
| 6,253,323 B1 | | 6/2001 | Cox et al. |
| 6,272,484 B1 | * | 8/2001 | Martin et al. ............... 707/1 |
| 6,377,704 B1 | | 4/2002 | Cooperman |
| 6,519,763 B1 | | 2/2003 | Kaufer et al. |
| 6,523,038 B1 | | 2/2003 | Iida et al. |
| 6,552,728 B1 | | 4/2003 | Moore et al. |
| 6,694,053 B1 | | 2/2004 | Burns et al. |
| 6,725,227 B1 | | 4/2004 | Li |
| 6,810,404 B1 | | 10/2004 | Ferguson et al. |
| 6,832,350 B1 | * | 12/2004 | Bates et al. ............... 715/206 |
| 6,865,713 B1 | * | 3/2005 | Bates et al. ............... 715/233 |
| 6,892,348 B1 | | 5/2005 | Truelove et al. |
| 6,957,384 B2 | | 10/2005 | Jeffery et al. |
| 6,992,687 B1 | | 1/2006 | Baird et al. |
| 7,165,220 B1 | | 1/2007 | Bates et al. |
| 7,194,677 B2 | | 3/2007 | Rizk et al. |
| 7,216,233 B1 | | 5/2007 | Krueger |
| 7,401,125 B1 | | 7/2008 | Uchida et al. |
| 2001/0003819 A1 | | 6/2001 | Matsumoto |
| 2001/0025309 A1 | | 9/2001 | Beck et al. |
| 2001/0054049 A1 | | 12/2001 | Maeda et al. |
| 2001/0054106 A1 | | 12/2001 | Anderson et al. |
| 2002/0029232 A1 | * | 3/2002 | Bobrow et al. ............... 707/517 |
| 2002/0095432 A1 | | 7/2002 | Shimomura et al. |
| 2002/0138582 A1 | | 9/2002 | Chandra et al. |
| 2003/0033319 A1 | | 2/2003 | Van Der et al. |
| 2004/0034835 A1 | | 2/2004 | Kuruoglu et al. |
| 2005/0024679 A1 | | 2/2005 | Yoda et al. |
| 2006/0059162 A1 | | 3/2006 | Rizk et al. |
| 2007/0283267 A1 | | 12/2007 | Jeffery et al. |
| 2007/0283288 A1 | | 12/2007 | Jeffery et al. |
| 2008/0046417 A1 | | 2/2008 | Jeffery et al. |

OTHER PUBLICATIONS

Website http://www.contractmanager.net, Contract Management Solutions, Copyright 2001, Contract Management Solutions, Inc., pp. 1-2, Apr. 23, 2001.

Website http://www.mycontacts.com, Contract management and business expense software, Copyright 2000, p. 1 of 1, Apr. 5, 2001.

* cited by examiner

ORGANIZATION NAME: _____    TODAY'S DATE: _____

CONTRACT COVER PAGE

PLEASE CIRCLE THE NUMBER THAT CORRESPONDS WITH THE APPROPRIATE SELECTION OF CONTRACTING ENTITY; DEPARTMENT; CONTRACT TYPE; AND SITE AND ATTACH THIS COVER PAGE TO THE DOCUMENT THAT WILL BE SCANNED. IN THE CASE OF USER-RESPONSIBLE PARTIES, PLEASE SELECT FROM YOUR USER LIST THE TWO INDIVIDUALS RESPONSIBLE FOR MANAGING THIS AGREEMENT, WHICH ARE ALSO THE TWO PEOPLE THAT WILL RECEIVE E-MAIL NOTIFICATIONS WHEN THIS AGREEMENT IS NEARING EXPIRATION.

CONTRACTING ENTITY: (PLEASE SELECT ONE FROM YOUR CONTRACTING ENTITY SETUP FORM)

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|

DEPARTMENT: (PLEASE SELECT ONE FROM YOUR LIST OF DEPARTMENTS)

| 1 | 2 | 3 | 4 | 5 | 6 | 7 | 8 | 9 | 10 | 11 | 12 |
|---|---|---|---|---|---|---|---|---|---|---|---|
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 |  |  |  |  |  |  |  |  |  |

CONTRACT TYPE: (PLEASE SELECT ONE FROM YOUR LIST OF CONTRACT TYPES)

| 1 | 2 | 3 | 4 | 5 | 6 | 7 | 8 | 9 | 10 | 11 | 12 |
|---|---|---|---|---|---|---|---|---|---|---|---|
| 13 | 14 | 15 | 16 | 17 | 18 | 19 | 20 | 21 | 22 | 23 | 24 |
| 25 | 25 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 |

SITE: (PLEASE SELECT ONE FROM YOUR SITE SETUP FORM)

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|

USER - RESPONSIBLE PARTIES: (PLEASE SELECT TWO FROM YOUR USER LIST)

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 |

*FIG. 1*

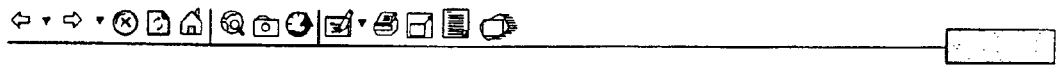
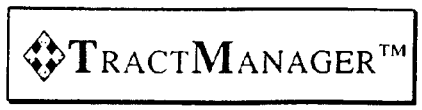
 
CONTRACT LIBRARY   EXECUTIVE COMMUNICATION   WORKFLOW MANAGER
*FIG. 2*

TractManager

CONTRACT DATABASE
- Medical Demo
- CONTRACT FILTER
- CONTRACT
- PARTY
- LOCATION
- DATES
- CRITICAL ISSUES
- CRITICAL LIST
- STATUS
- NEW CONTRACT
- Vendor Directory
- ADMIN WORK FLOW
HELP
Get Adobe Reader

TractManager™

CONTRACT ATTRIBUTE SEARCH
- CONTRACTING ENTITY: ALL
- SITE: ALL
- DEPARTMENT: ALL
- CONTRACT TYPE: ALL
- SORT BY: CONTRACT NUMBER
- KEYWORD:

[SEARCH]

CONTRACT KEY WORD SEARCH
- SEARCH FOR:
- SEARCH LIST OF: ● CONTRACTS  ○ VENDORS
- RETURN A MAXIMUM OF: 10
- ☐ USE WORD VARIANTS ("CAT" WILL ALSO FIND "CATS")
- ☐ FUZZY SEARCH

[SEARCH]

*FIG. 3*

CONTRACT SUMMARY - CONTRACT NUMBER

⇦ PREVIOUS  ⇨ NEXT  ✚ EXPAND  − COLLAPSE  🔍 SEARCH

| CONTRACT NUMBER | CONTRACTING ENTITY/VENDOR (OTHER PARTY) | DESCRIPTION/DEPARTMENT | ORIGINAL DATE/ EXPIRATION DATE |
|---|---|---|---|
| 5896.1C | TRACT MANAGER LLC, NOTABLE SOLUTIONS, INC. | SOFTWARE LICENSE & SERVICE AGREEMENT INFORMATION TECHNOLOGY | NOVEMBER 6, 2000/ NOVEMBER 6, 2001 |
| 9501.4C | MEDITRACT LLC, UAB HEALTH SYSTEM | SOFTWARE LICENSE & SERVICE AGREEMENT OPERATIONS | JULY 18, 2000/ JULY 17, 2001 |
| 9501.7C | MEDITRACT LLC, ADVENTIST HEALTH SYSTEM | SOFTWARE LICENSE & SERVICE AGREEMENT OPERATIONS | AUGUST 3, 2000/ AUGUST 2, 2003 |
| 9501.10C | MEDITRACT LLC, ERLANGER MEDICAL CENTER | SOFTWARE LICENSE & SERVICE AGREEMENT OPERATIONS | MAY 10, 1999/ MAY 9, 2001 |
| 9501.13C | MEDITRACT LLC, LIFE CARE MANAGEMENT SERVICES | SOFTWARE LICENSE & SERVICE AGREEMENT OPERATIONS | JULY 9, 1999/ JULY 8, 2001 |
| 9501.14C | MEDITRACT LLC, UCSF STANFORD HEALTH CARE | SOFTWARE LICENSE & SERVICE AGREEMENT OPERATIONS | AUGUST 12, 1999/ AUGUST 11, 2001 |
| 9501.16C | MEDITRACT LLC, BAPTIST HOSPITAL, INC. | SOFTWARE LICENSE & SERVICE AGREEMENT OPERATIONS | MAY 24, 1999/ MAY 23, 2001 |

Sidebar:
- TractManager
- CONTRACT DATABASE
  - Medical Demo
- CONTRACT FILTER
- CONTRACT NUMBER
  - TYPE
  - PARTY
  - LOCATION
  - DATES
  - CRITICAL ISSUES
  - CRITICAL LIST
  - STATUS
  - NEW CONTRACT
  - Vendor Directory
  - ADMIN
- WORK FLOW
- HELP
- Get Adobe Reader

*FIG. 4 (CONT)-1*

TractManager
◆ CONTRACT DATABASE
  Medical Demo
  Ⓐ CONTRACT FILTER
  Ⓑ CONTRACT NUMBER
    Ⓒ TYPE
    Ⓓ PARTY
    Ⓔ LOCATION
    Ⓕ DATES
    Ⓖ CRITICAL ISSUES
    Ⓗ CRITICAL LIST
    Ⓘ STATUS
    Ⓙ NEW CONTRACT
    Ⓚ Vendor Directory
    Ⓛ ADMIN
WORK FLOW
HELP
Get Adobe Reader

⇦ PREVIOUS ⇨ NEXT ✚ EXPAND ═ COLLAPSE 🔍 SEARCH

CONTRACT SUMMARY - CONTRACT NUMBER

| CONTRACT NUMBER | CONTRACTING ENTITY/VENDOR (OTHER PARTY) | DESCRIPTION/DEPARTMENT | ORIGINAL DATE/ EXPIRATION DATE |
|---|---|---|---|
| 9501.17C | MEDITRACT LLC, SHORE HEALTH SYSTEM, INC. | SOFTWARE LICENSE & SERVICE AGREEMENT OPERATIONS | JULY 25, 2000/ JULY 24, 2003 |
| 9501.18C | MEDITRACT LLC, RALEIGH GENERAL HOSPITAL | SOFTWARE LICENSE & SERVICE AGREEMENT OPERATIONS | AUGUST 9, 2000/ AUGUST 8, 2003 |
| 9501.19C | MEDITRACT LLC, VIRGINIA BLOOD SERVICES | SOFTWARE LICENSE & SERVICE AGREEMENT OPERATIONS | JUNE 16, 2000/ JUNE 15, 2003 |
| 9501.20C | MEDITRACT LLC, ST. MARY MEDICAL CENTER | SOFTWARE LICENSE & SERVICE AGREEMENT OPERATIONS | FEBRUARY 18, 2000/ FEBRUARY 17, 2003 |
| 9501.21C | MEDITRACT LLC, SOUTH CAROLINA HEALTHCARE RESOURCES, INC. | HOSPITAL ASSOCIATION AGREEMENT | AUGUST 11, 2000/ AUGUST 10, 2002 |
| 9501.22C | MEDITRACT LLC, ALABAMA DIVERSIFIED HEALTH SERVICES | MARKETING & SALES HOSPITAL ASSOCIATION AGREEMENT | JUNE 6, 2000/ JUNE 5, 2002 |
| 9501.24C | MEDITRACT LLC, PERSHING YOAKLEY & ASSOC LLC | MARKETING & SALES HOSPITAL ASSOCIATION AGREEMENT | JANUARY 20, 2000/ JANUARY 19, 2002 |

*FIG. 4 (CONT)-2*

CONTRACT SUMMARY - TYPE

⇦ PREVIOUS ⇨ NEXT ✦ EXPAND ▭ COLLAPSE 🔍 SEARCH

TYPE CONTRACTING ENTITY/VENDOR (OTHER PARTY) CONTRACT NUMBER DESCRIPTION/
DEPARTMENT ORIGINAL DATE/EXPIRATION DATE

- ▶ COMPUTER EQUIPMENT LEASE
- ▶ CONTRACT LABOR
- ▶ EQUIPMENT LEASE (OFFICE)
- ▶ FINANCING AGREEMENT
- ▶ GROUP INSURANCE POLICY
- ▶ HOSPITAL ASSOCIATION AGREEMENT
- ▶ HOSTING SERVICES AGREEMENT
- ▶ INFORMATION SERVICES AGREEMENT
- ▶ INSURANCE POLICY
- ▶ OPERATING AGREEMENT
- ▶ PAYROLL SERVICE AGREEMENT
- ▶ PERMITS AND LICENSES
- ▶ REAL ESTATE LEASE
- ▶ SALES REPRESENTATIVE AGREEMENT
- ▶ SOFTWARE LICENSE & SERVICE AGREEMENT

⇦ PREVIOUS ⇨ NEXT ✦ EXPAND ▭ COLLAPSE 🔍 SEARCH

TractManager
- CONTRACT DATABASE
  - Medical Demo
- CONTRACT FILTER
- CONTRACT
  - NUMBER
  - TYPE
  - PARTY
  - LOCATION
  - DATES
  - CRITICAL ISSUES
  - CRITICAL LIST
  - STATUS
  - NEW CONTRACT
  - Vendor Directory
  - ADMIN
- WORK FLOW
- HELP
- Get Adobe Reader

*FIG. 5*

| SIGNATORY | CONTRACTING ENTITY/VENDOR (OTHER PARTY) | CONTRACT # | CONTRACT/DEPARTMENT | ORIGINAL DATE/ EXPIRATION DATE |
|---|---|---|---|---|
| BEN HERNSBY | MEDITRACT LLC, LIFE CARE MANAGEMENT SERVICES | 9501.13C | SOFTWARE LICENSE & SERVICE AGREEMENT OPERATIONS | JULY 9, 1999/ JULY 8, 2001 |
| BEN HERNSBY | MEDITRACT LLC, MHA DIVERSIFIED SERVICES, INC. MHA | 9501.63C | HOSPITAL ASSOCIATION AGREEMENT MARKETING & SALES | AUGUST 30, 1999/ AUGUST 29, 2001 |
| BEN HERNSBY | MEDITRACT LLC, PERSHING YOAKLEY & ASSOC LLC | 9501.24C | HOSPITAL ASSOCIATION AGREEMENT MARKETING & SALES | JANUARY 20, 2000/ JANUARY 19, 2002 |
| BEN HERNSBY | MEDITRACT LLC, SOUTH CAROLINA HEALTHCARE RESOURCES, INC. | 9501.21C | HOSPITAL ASSOCIATION AGREEMENT MARKETING & SALES | AUGUST 11, 2000/ AUGUST 10, 2002 |
| BEN HERNSBY | MEDITRACT LLC, ST. MARY MEDICAL CENTER | 9501.20C | SOFTWARE LICENSE & SERVICE AGREEMENT OPERATIONS | FEBRUARY 18, 2000/ FEBRUARY 17, 2003 |
| BEN HERNSBY | MEDITRACT LLC, SUNTRUST BANK, CHATTANOOGA | 9501.55C | FINANCING AGREEMENT FINANCE | MARCH 3, 1999/ MARCH 3, 2005 |
| BEN HERNSBY | MEDITRACT LLC, XTRA HELP PERSONNEL, INC. | 9501.72C | CONTRACT LABOR HUMAN RESOURCES | DECEMBER 6, 1999/ DECEMBER 6, 2000 |
| BROOKS AYERS | MEDITRACT LLC, NORTH MISSISSIPPI HEALTH SERVICES | 9501.58C | SOFTWARE LICENSE & SERVICE AGREEMENT OPERATIONS | JANUARY 13, 2000/ JANUARY 13, 2002 |

*FIG. 6 (CONT)-1*

| | | SIGNATORY | | |
|---|---|---|---|---|
| SIGNATORY | CONTRACTING ENTITY/VENDOR (OTHER PARTY) | CONTRACT # | CONTRACT/DEPARTMENT | ORIGINAL DATE/ EXPIRATION DATE |
| COLE POWELL | MEDITRACT LLC; ADP | 9501.68C | PAYROLL SERVICE AGREEMENT HUMAN RESOURCES | MARCH 10, 2000/ MARCH 10, 2001 |
| COLE POWELL | MEDITRACT LLC; BAPTIST HOSPITAL, INC. | 9501.16C | SOFTWARE LICENSE & SERVICE AGREEMENT OPERATIONS | MAY 24, 1999/ MAY 23, 2001 |
| COLE POWELL | MEDITRACT LLC; ERLANGER MEDICAL CENTER | 9501.10C | SOFTWARE LICENSE & SERVICE AGREEMENT OPERATIONS | MAY 10, 1999/ MAY 9, 2001 |
| COLE POWELL | MEDITRACT LLC; UCSF STANFORD HEALTH CARE | 9501.14C | SOFTWARE LICENSE & SERVICE AGREEMENT OPERATIONS | AUGUST 12, 1999/ AUGUST 11, 2001 |
| GARY O'GWEN | MEDITRACT LLC; ALABAMA DIVERSIFIED HEALTH SERVICES | 9501.22C | HOSPITAL ASSOCIATION AGREEMENT MARKETING & SALES | JUNE 6, 2000/ JUNE 5, 2002 |
| GARY O'GWEN | MEDITRACT LLC; LEICHTMAN, ROBERT | 9501.25C | SALES REPRESENTATIVE AGREEMENT MARKETING & SALES | JUNE 10, 2000/ JUNE 9, 2001 |

*FIG. 6 (CONT)-2*

| OTHER SIGNATORY | CONTRACTING ENTITY/VENDOR (OTHER PARTY) | CONTRACT # | CONTRACT/DEPARTMENT | ORIGINAL DATE/ EXPIRATION DATE |
|---|---|---|---|---|
| JOHNNY ALVAREZ | MEDITRACT LLC, HEWLETT-PACKARD | 9501.45C | COMPUTER EQUIPMENT LEASE, INFORMATION TECHNOLOGY | JUNE 30, 2000/ JUNE 29, 2002 |
| LORA A. MOFFATT | MEDITRACT LLC, ASSISTANT COMMISSIONER FOR TRADEMARKS | 9501.69C | PERMITS AND LICENSES ADMINISTRATION (CORPORATE) | JUNE 7, 2000/ JUNE 7, 2005 |
| MIKE FRAZIER | MEDITRACT LLC, RANDSTAD STAFFING SERVICES | 9501.51C | PAYROLL SERVICE AGREEMENT HUMAN RESOURCES | APRIL 10, 2000/ OCTOBER 10, 2001 |
| REZA AZARM | TRACTMANAGER LLC, NOTABLE SOLUTIONS, INC. | 5896.1C | SOFTWARE LICENSE & SERVICE AGREEMENT INFORMATION TECHNOLOGY | NOVEMBER 6, 2000/ NOVEMBER 6, 2001 |
| SANDRET JOHNSON | MEDITRACT LLC, ADVENTIST HEALTH SYSTEM | 9501.7C | SOFTWARE LICENSE & SERVICE AGREEMENT, OPERATIONS | AUGUST 3, 2000/ AUGUST 2, 2003 |
| STEVE PICKETT | MEDITRACT LLC, UAB HEALTH SYSTEM | 9501.4C | SOFTWARE LICENSE & SERVICE AGREEMENT, OPERATIONS | JULY 18, 2000/ JULY 17, 2001 |
| | MEDITRACT LLC, ADP | 9501.68C | PAYROLL SERVICE AGREEMENT HUMAN RESOURCES | MARCH 10, 2000/ MARCH 10, 2001 |
| | MEDITRACT LLC, ALABAMA DIVERSIFIED HEALTH SERVICES | 9501.22C | HOSPITAL ASSOCIATION AGREEMENT MARKETING & SALES | JUNE 6, 2000/ JUNE 5, 2002 |
| | MEDITRACT LLC, BAPTIST HOSPITAL, INC. | 9501.16C | SOFTWARE LICENSE & SERVICE AGREEMENT, OPERATIONS | MAY 24, 1999/ MAY 23, 2001 |

| OTHER SIGNATORY CONTRACTING ENTITY/VENDOR (OTHER PARTY) | CONTRACT # | CONTRACT/DEPARTMENT | ORIGINAL DATE/ EXPIRATION DATE |
|---|---|---|---|
| MEDITRACT LLC, BCBS OF TN | 9501.31C | GROUP INSURANCE POLICY, HUMAN RESOURCES | SEPTEMBER 1, 2000/ AUGUST 30, 2001 |
| MEDITRACT LLC, CHATTANOOGA DATA CONNECTION, INC. | 9501.38C | INFORMATION SERVICES AGREEMENT, INFORMATION TECHNOLOGY | JUNE 5, 2000/ JUNE 4, 2001 |
| MEDITRACT LLC, CONWAY HOSPITAL | 9501.64C | SOFTWARE LICENSE & SERVICE AGREEMENT, OPERATIONS | OCTOBER 4, 2000/ OCTOBER 16, 2003 |
| MEDITRACT LLC, CUMBERLAND MEDICAL CENTER | 9501.61C | SOFTWARE LICENSE & SERVICE AGREEMENT, MARKETING & SALES | JULY 26, 2000/ JULY 25, 2003 |
| MEDITRACT LLC, DELL FINANCIAL SERVICE L.P. | 9501.46C | COMPUTER EQUIPMENT LEASE, INFORMATION TECHNOLOGY | JANUARY 5, 2000/ JANUARY 4, 2003 |
| MEDITRACT LLC, EDGEFIELD COUNTY HOSPITAL | 9501.65C | SOFTWARE LICENSE & SERVICE AGREEMENT, OPERATIONS | OCTOBER 11, 2000/ OCTOBER 10, 2003 |
| MEDITRACT LLC, ERLANGER MEDICAL CENTER | 9501.10C | SOFTWARE LICENSE & SERVICE AGREEMENT, OPERATIONS | MAY 10, 1999/ MAY 9, 2001 |
| MEDITRACT LLC, HEALTH SHARE/THA | 9501.59C | HOSPITAL ASSOCIATION AGREEMENT, MARKETING & SALES | MAY 19, 2000/ MAY 18, 2003 |
| MEDITRACT LLC, HEART HOSPITAL IV d/b/a HEART HOSPITAL OF AUSTIN | 9501.60C | SOFTWARE LICENSE & SERVICE AGREEMENT, OPERATIONS | SEPTEMBER 1, 2000/ AUGUST 31, 2002 |
| MEDITRACT LLC, INTERLIANT INC. | 9501.27C | HOSTING SERVICES AGREEMENT INFORMATION | JUNE 1, 2000/ MAY 31, 2001 |

CONTRACT SUMMARY - RESPONSIBLE PARTY

⇦ PREVIOUS ⇧ NEXT ✛ EXPAND ▭ COLLAPSE 🔍 SEARCH

| CONTRACTING ENTITY/VENDOR (OTHER PARTY) | CONTRACT NUMBER | DEPARTMENT | ORIGINAL DATE/ EXPIRATION DATE | TOTAL |
|---|---|---|---|---|
| ▸ GARY O'GWEN | | | | 26 |
| ▾ MIKE DRAWBAUGH | | | | 1 |
| TRACTMANAGER LLC, NOTABLE SOLUTIONS, INC. | 5896.1C | SOFTWARE LICENSE & SERVICE AGREEMENT INFORMATION TECHNOLOGY | NOVEMBER 6, 2000/ NOVEMBER 6, 2001 | |
| ▸ SCOTT JEFFERY | | | | 19 |
| ▸ THOMAS RICK | | | | 2 |

⇦ PREVIOUS ⇧ NEXT ✛ EXPAND ▭ COLLAPSE 🔍 SEARCH

FIG. 8

⇦ PREVIOUS  ⇨ NEXT  ✛ EXPAND  ⊏ COLLAPSE  🔍 SEARCH

CONTRACT SUMMARY - VENDOR

| CONTRACTING ENTITY/VENDOR (OTHER PARTY) | CONTRACT NUMBER | DESCRIPTION/DEPARTMENT | ORIGINAL DATE/ EXPIRATION DATE |
|---|---|---|---|
| ▴ ADP | | | |
| ▴ ADVENTIST HEALTH SYSTEM | | | |
| ▴ ALABAMA DIVERSIFIED HEALTH SERVICES | | | |
| ▾ ASSISTANT COMMISSIONER FOR TRADE MARKS | | | |
| MEDITRACT LLC, ASSISTANT COMMISSIONER FOR TRADEMARKS | 9501.69C | PERMITS AND LICENSES ADMINISTRATION (CORPORATE) | JUNE 7, 2000/ JUNE 7, 2005 |
| ▴ BAPTIST HOSPITAL, INC. | | | |
| ▴ BCBS OF TN | | | |
| ▴ CHATTANOOGA DATA CONNECTION, INC. | | | |
| ▴ CONWAY HOSPITAL | | | |
| ▴ CUMBERLAND MEDICAL CENTER | | | |
| ▴ DELL FINANCIAL SERVICES L.P. | | | |
| ▴ EDGEFIELD COUNTY HOSPITAL | | | |
| ▴ ERLANGER MEDICAL CENTER | | | |
| ▴ HEALTH SHARE/THA | | | |
| ▴ HEART HOSPITAL IV d/b/a HEART HOSPITAL OF AUSTIN | | | |
| ▴ HEWLETT-PACKARD | | | |
| ▴ INTERLIANT, INC. | | | |
| ▴ LEGION INSUR CO/COMP FIRST | | | |

Sidebar:
- TractManager
- ◆ CONTRACT DATABASE
  - Medical Demo
  - CONTRACT FILTER
  - CONTRACT
  - PARTY
    - SIGNATORY
    - OTHER SIGNATORY
    - RESPONSIBLE
  - VENDOR (OTHER PARTY)
  - LOCATION
  - DATES
  - CRITICAL ISSUES
  - CRITICAL LIST
  - STATUS
  - NEW CONTRACT
  - Vendor Directory
- WORK FLOW
- HELP
- Get Adobe Reader

*FIG. 9 (CONT)-1*

CONTRACT SUMMARY - SITE

| CONTRACTING ENTITY/VENDOR (OTHER PARTY) | CONTRACT NUMBER | DESCRIPTION/DEPARTMENT | ORIGINAL DATE/ EXPIRATION DATE |
|---|---|---|---|
| ▼ CHATTANOOGA OFFICE | | | |
| MEDITRACT LLC, ADP | 9501.68C | PAYROLL SERVICE AGREEMENT<br>HUMAN RESOURCES | MARCH 10, 2000/<br>MARCH 10, 2001 |
| MEDITRACT LLC, ADVENTIST HEALTH SYSTEM | 9501.7C | SOFTWARE LICENSE & SERVICE AGREEMENT<br>OPERATIONS | AUGUST 3, 2000/<br>AUGUST 2, 2003 |
| MEDITRACT LLC, ALABAMA DIVERSIFIED HEALTH SERVICES | 9501.22C | HOSPITAL ASSOCIATION AGREEMENT<br>MARKETING & SALES | JUNE 6, 2000/<br>JUNE 5, 2002 |
| MEDITRACT LLC, ASSISTANT COMMISSIONER FOR TRADEMARKS | 9501.69C | PERMITS AND LICENSES<br>ADMINISTRATION (CORPORATE) | JUNE 7, 2000/<br>JUNE 7, 2005 |
| MEDITRACT LLC, BAPTIST HOSPITAL, INC. | 9501.16C | SOFTWARE LICENSE & SERVICE AGREEMENT<br>OPERATIONS | MAY 24, 1999/<br>MAY 23, 2001 |
| MEDITRACT LLC, BCBS OF TN | 9501.31C | GROUP INSURANCE POLICY<br>HUMAN RESOURCES | SEPTEMBER 1, 2000/<br>AUGUST 30, 2001 |
| MEDITRACT LLC, CHATTANOOGA DATA CONNECTION INC. | 9501.38C | INFORMATION SERVICES AGREEMENT<br>INFORMATION TECHNOLOGY | JUNE 5, 2000/<br>JUNE 4, 2001 |
| MEDITRACT LLC, CONWAY HOSPITAL | 9501.64C | SOFTWARE LICENSE & SERVICE AGREEMENT<br>OPERATIONS | OCTOBER 4, 2000/<br>OCTOBER 16, 2003 |

*FIG. 12 (CONT)-1*

CONTRACT SUMMARY - SITE

⇦ PREVIOUS  ⇨ NEXT   ╬ EXPAND   = COLLAPSE   🔍 SEARCH

| CONTRACTING ENTITY/VENDOR (OTHER PARTY) | CONTRACT NUMBER | DESCRIPTION/DEPARTMENT | ORIGINAL DATE/ EXPIRATION DATE |
|---|---|---|---|
| ▼ CHATTANOOGA OFFICE | | | |
| MEDITRACT LLC, CUMBERLAND MEDICAL CENTER | 9501.61C | SOFTWARE LICENSE & SERVICE AGREEMENT MARKETING & SALES | JULY 26, 2000/ JULY 25, 2003 |
| MEDITRACT LLC, DELL FINANCIAL SERVICES L.P. | 9501.46C | COMPUTER EQUIPMENT LEASE INFORMATION TECHNOLOGY | JANUARY 5, 2000/ JANUARY 4, 2003 |
| MEDITRACT LLC, EDGEFIELD COUNTY HOSPITAL | 9501.65C | SOFTWARE LICENSE & SERVICE AGREEMENT OPERATIONS | OCTOBER 11, 2000/ OCTOBER 10, 2003 |
| MEDITRACT LLC, ERLANGER MEDICAL CENTER | 9501.10C | SOFTWARE LICENSE & SERVICE AGREEMENT OPERATIONS | MAY 10, 1999/ MAY 9, 2001 |
| MEDITRACT LLC, HEALTH SHARE/THA | 9501.59C | HOSPITAL ASSOCIATION AGREEMENT MARKETING & SALES | MAY 19, 2000/ MAY 18, 2003 |
| MEDITRACT LLC, HEART HOSPITAL IV d/b/a HEART HOSPITAL OF AUSTIN | 9501.60C | SOFTWARE LICENSE & SERVICE AGREEMENT OPERATIONS | SEPTEMBER 1, 2000/ AUGUST 31, 2003 |
| MEDITRACT LLC, HEWLETT-PACKARD | 9501.45C | COMPUTER EQUIPMENT LEASE INFORMATION TECHNOLOGY | JUNE 30, 2000/ JUNE 29, 2002 |

*FIG. 12 (CONT)-2*

CONTRACT SUMMARY - NOTES ORIGINAL DATE

| ORIGINAL DATE | CONTRACTING ENTITY/VENDOR (OTHER PARTY) | CONTRACT NUMBER | CONTRACT/DEPARTMENT | ORIGINAL/ EXPIRATION |
|---|---|---|---|---|
| 03/03/99 | MEDITRACT LLC, SUNTRUST BANK, CHATTANOOGA | 9501.55C | FINANCING AGREEMENT FINANCE | MARCH 3, 1999/ MARCH 3, 2005 |
| 05/10/99 | MEDITRACT LLC, ERLANGER MEDICAL CENTER | 9501.10C | SOFTWARE LICENSE & SERVICE AGREEMENT, OPERATIONS | MAY 10, 1999/ MAY 9, 2001 |
| 05/24/99 | MEDITRACT LLC, BAPTIST HOSPITAL, INC. | 9501.16C | SOFTWARE LICENSE & SERVICE AGREEMENT, OPERATIONS | MAY 24, 1999/ MAY 23, 2001 |
| 07/09/99 | MEDITRACT LLC, LIFE CARE MANAGEMENT SERVICES | 9501.13C | SOFTWARE LICENSE & SERVICE AGREEMENT, OPERATIONS | JULY 9, 1999/ JULY 8, 2001 |
| 08/12/99 | MEDITRACT LLC, UCSF STANFORD HEALTH CARE | 9501.14C | SOFTWARE LICENSE & SERVICE AGREEMENT, OPERATIONS | AUGUST 12, 1999/ AUGUST 11, 2001 |
| 08/30/99 | MEDITRACT LLC, MHA DIVERSIFIED SERVICES, INC. MHA | 9501.63C | HOSPITAL ASSOCIATION AGREEMENT | AUGUST 30, 1999/ AUGUST 29, 2001 |
| 12/06/99 | MEDITRACT LLC, XTRA HELP PERSONNEL, INC. | 9501.72C | MARKETING & SALES CONTRACT LABOR HUMAN RESOURCES | DECEMBER 6, 1999/ DECEMBER 6, 2000 |
| 12/31/99 | MEDITRACT LLC,MEDITRACT, LLC | 9501.70C | OPERATING AGREEMENT BOARD OF DIRECTORS | DECEMBER 31, 1999/ DECEMBER 31, 2000 |
| 12/31/99 | MEDITRACT LLC, ULTRAHEALTH, LLC | 9501.57C | FINANCING AGREEMENT FINANCE | DECEMBER 31, 1999/ JANUARY 1, 2002 |
| 01/05/2000 | MEDITRACT LLC, DELL FINANCIAL SERVICES L.P. | 9501.46C | COMPUTER EQUIPMENT LEASE INFORMATION TECHNOLOGY | JANUARY 5, 2000/ JANUARY 4, 2003 |

*FIG. 14 (CONT)-1*

CONTRACT SUMMARY - NOTES ORIGINAL DATE

| ORIGINAL DATE | CONTRACTING ENTITY/VENDOR (OTHER PARTY) | CONTRACT NUMBER | CONTRACT/DEPARTMENT | ORIGINAL/ EXPIRATION |
|---|---|---|---|---|
| 01/13/2000 | MEDITRACT LLC, NORTH MISSISSIPPI HEALTH SERVICES | 9501.58C | SOFTWARE LICENSE & SERVICE AGREEMENT, OPERATIONS | JANUARY 13, 2000/ JANUARY 13, 2002 |
| 01/20/2000 | MEDITRACT LLC, PERSHING YOAKLEY & ASSOC LLC | 9501.24C | HOSPITAL ASSOCIATION AGREEMENT MARKETING & SALES | JANUARY 20, 2000/ JANUARY 19, 2002 |
| 02/18/2000 | MEDITRACT LLC, ST. MARY MEDICAL CENTER | 9501.20C | SOFTWARE LICENSE & SERVICE AGREEMENT, OPERATIONS | FEBRUARY 18, 2000/ FEBRUARY 17, 2003 |
| 03/10/2000 | MEDITRACT LLC, ADP | 9501.68C | PAYROLL SERVICE AGREEMENT HUMAN RESOURCES | MARCH 10, 2000/ MARCH 10, 2001 |
| 04/10/2000 | MEDITRACT LLC, RANDSTAD STAFFING SERVICES | 9501.51C | PAYROLL SERVICE AGREEMENT HUMAN RESOURCES | APRIL 10, 2000/ OCTOBER 10, 2001 |
| 04/19/2000 | MEDITRACT LLC, TALLAN HOLDINGS CO | 9501.49C | REAL ESTATE LEASE FINANCE | APRIL 19, 2000/ APRIL 18, 2003 |

TractManager
CONTRACT DATABASE
Medical Demo
- CONTRACT FILTER
- CONTRACT
  - PARTY
  - LOCATION
  - DATES
    - ORIGINAL
    - EXPIRATION
      - MY EXPIRATION DATE
      - AUTO RENEWAL
  - CRITICAL ISSUES
  - CRITICAL LIST
  - STATUS
  - NEW CONTRACT
  - Vendor Directory

WORK FLOW

HELP

Get Adobe Reader

⇦ PREVIOUS  ⇨ NEXT   ✚ EXPAND   ━ COLLAPSE   🔍 SEARCH

EXPIRATION DATE

| EXP. DATE | CONTRACTING ENTITY/VENDOR (OTHER PARTY) | CONTRACT NUMBER | DESCRIPTION/DEPARTMENT | ORIGINAL DATE/ EXPIRATION DATE |
|---|---|---|---|---|
| 12/06/2000 | MEDITRACT LLC, XTRA HELP PERSONNEL, INC. | 9501.72C | CONTRACT LABOR HUMAN RESOURCES | DECEMBER 6, 1999/ DECEMBER 6, 2000 |
| 12/27/2000 | MEDITRACT LLC, SOUTHERN COFFEE SERVICE | 9501.71C | EQUIPMENT LEASE (OFFICE) FINANCE | JUNE 27, 2000/ DECEMBER 27, 2000 |
| 12/31/2000 | MEDITRACT LLC, MEDITRACT LLC, | 9501.70C | OPERATING AGREEMENT BOARD OF DIRECTORS | DECEMBER 31, 1999/ DECEMBER 31, 2000 |
| 03/10/2001 | MEDITRACT LLC, ADP | 9501.68C | PAYROLL SERVICE AGREEMENT HUMAN RESOURCES | MARCH 10, 2000/ MARCH 10, 2001 |
| 05/09/2001 | MEDITRACT LLC, ERLANGER MEDICAL CENTER | 9501.10C | SOFTWARE LICENSE & SERVICE AGREEMENT, OPERATIONS | MAY 10, 1999/ MAY 9, 2001 |
| 05/23/2001 | MEDITRACT LLC, BAPTIST HOSPITAL, INC. | 9501.16C | SOFTWARE LICENSE & SERVICE AGREEMENT, OPERATIONS | MAY 24, 1999/ MAY 23, 2001 |
| 05/31/2001 | MEDITRACT LLC, INTERLIANT, INC. | 9501.27C | HOSTING SERVICES AGREEMENT INFORMATION TECHNOLOGY | JUNE 1, 2000/ MAY 31, 2001 |
| 06/01/2001 | MEDITRACT LLC, INTERLIANT, INC. | 9501.35C | HOSTING SERVICES AGREEMENT INFORMATION TECHNOLOGY | JUNE 2, 2000/ JUNE 1, 2001 |
| 06/04/2001 | MEDITRACT LLC, CHATTANOOGA DATA CONNECTION, INC. | 9501.38C | INFORMATION SERVICES AGREEMENT INFORMATION TECHNOLOGY | JUNE 5, 2000/ JUNE 4, 2001 |
| 06/09/2001 | MEDITRACT LLC, LEICHTMAN, ROBERT | 9501.25C | SALE REPRESENTATIVE AGREEMENT MARKETING & SALES | JUNE 10, 2000/ JUNE 9, 2001 |

EXPIRATION DATE

| EXP. DATE | CONTRACTING ENTITY/VENDOR (OTHER PARTY) | CONTRACT NUMBER | DESCRIPTION/DEPARTMENT | ORIGINAL DATE/ EXPIRATION DATE |
|---|---|---|---|---|
| 06/13/2001 | MEDITRACT LLC, MSA INC. | 9501.37C | EQUIPMENT LEASE (OFFICE) FINANCE | JUNE 14, 2000/ JUNE 13, 2001 |
| 07/08/2001 | MEDITRACT LLC, LIFE CARE MANAGEMENT SERVICES | 9501.13C | SOFTWARE LICENSE & SERVICE AGREEMENT, OPERATIONS | JULY 9, 1999/ JULY 8, 2001 |
| 07/17/2001 | MEDITRACT LLC, UAB HEALTH SYSTEM | 9501.4C | SOFTWARE LICENSE & SERVICE AGREEMENT, OPERATIONS | JULY 18, 2000/ JULY 17, 2001 |
| 07/19/2001 | MEDITRACT LLC, NETWORK SOLUTIONS, INC. | 9501.39C | INFORMATION SERVICES AGREEMENT INFORMATION TECHNOLOGY | JULY 20, 2000/ JULY 19, 2001 |
| 07/23/2001 | MEDITRACT LLC, LEGION INSUR CO/ COMPFIRST | 9501.34C | GROUP INSURANCE POLICY FINANCE | JULY 24, 2000/ JULY 23, 2001 |
| 08/11/2001 | MEDITRACT LLC, UCSF STANFORD HEALTH CARE | 9501.14C | SOFTWARE LICENSE & SERVICE AGREEMENT, OPERATIONS | AUGUST 12, 1999/ AUGUST 11, 2001 |

*FIG. 15 (CONT)-2*

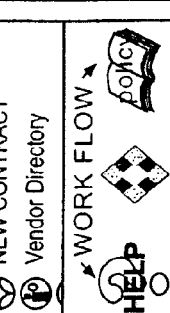
FIG. 16 (CONT)-1

MY EXPIRATION DATES

| EXPIRATION DATE | CONTRACTING ENTITY/VENDOR (OTHER PARTY) | CONTRACT NUMBER | DESCRIPTION/DEPARTMENT | RESPONSIBLE 1 | RESPONSIBLE 2 | STATUS |
|---|---|---|---|---|---|---|
| JUNE 13, 2001 | MEDITRACT LLC, MSA INC. | 9501.37C | EQUIPMENT LEASE (OFFICE) FINANCE | SCOTT JEFFERY | TINA JOHNSON | ACTIVE |
| JULY 8, 2001 | MEDITRACT LLC, LIFE CARE MANAGEMENT SERVICES | 9501.13C | SOFTWARE LICENSE & SERVICE AGREEMENT, OPERATIONS | GARY O'GWEN | SCOTT JEFFERY | ACTIVE |
| JULY 17, 2001 | MEDITRACT LLC, UAB HEALTH SYSTEM | 9501.4C | SOFTWARE LICENSE & SERVICE AGREEMENT, OPERATIONS | GARY O'GWEN | SCOTT JEFFERY | ACTIVE |
| JULY 19, 2001 | MEDITRACT LLC, NETWORK SOLUTIONS, INC. | 9501.39C | INFORMATION SERVICES AGREEMENT INFORMATION TECHNOLOGY | SCOTT JEFFERY | JEFF TAYLOR | ACTIVE |
| JULY 23, 2001 | MEDITRACT LLC, LEGION INSUR CO/ COMPFIRST | 9501.34C | GROUP INSURANCE POLICY FINANCE | SCOTT JEFFERY | TINA JOHNSON | ACTIVE |
| AUGUST 11, 2001 | MEDITRACT LLC, UCSF STANFORD HEALTH CARE | 9501.14C | SOFTWARE LICENSE & SERVICE AGREEMENT OPERATIONS | GARY O'GWEN | SCOTT JEFFERY | ACTIVE |

*FIG. 16 (CONT)-2*

AUTO RENEWAL

| CONTRACT NUMBER | CONTRACTING ENTITY/VENDOR (OTHER PARTY) | DESCRIPTION/DEPARTMENT | ORIGINAL DATE/ EXPIRATION DATE |
|---|---|---|---|
| 5896.1C | TRACTMANAGER LLC, NOTABLE SOLUTIONS, INC. | SOFTWARE LICENSE & SERVICE AGREEMENT INFORMATION TECHNOLOGY | NOVEMBER 6, 2000/ NOVEMBER 6, 2001 |
| 9501.10C | MEDITRACT LLC, ERLANGER MEDICAL CENTER | SOFTWARE LICENSE & SERVICE AGREEMENT, OPERATIONS | MAY 10, 1999/ MAY 9, 2001 |
| 9501.13C | MEDITRACT LLC, LIFE CARE MANAGEMENT SERVICES | SOFTWARE LICENSE & SERVICE AGREEMENT, OPERATIONS | JULY 9, 1999/ JULY 8, 2001 |
| 9501.14C | MEDITRACT LLC, UCSF STANFORD HEALTH CARE | SOFTWARE LICENSE & SERVICE AGREEMENT, OPERATIONS | AUGUST 12, 1999/ AUGUST 11, 2001 |
| 9501.16C | MEDITRACT LLC, BAPTIST HOSPITAL, INC. | SOFTWARE LICENSE & SERVICE AGREEMENT, OPERATIONS | MAY 24, 1999/ MAY 23, 2001 |
| 9501.17C | MEDITRACT LLC, SHORE HEALTH SYSTEM, INC. | SOFTWARE LICENSE & SERVICE AGREEMENT, OPERATIONS | JULY 25, 2000/ JULY 24, 2003 |
| 9501.19C | MEDITRACT LLC, VIRGINIA BLOOD SERVICES | SOFTWARE LICENSE & SERVICE AGREEMENT, OPERATIONS | JUNE 16, 2000/ JUNE 15, 2003 |
| 9501.27C | MEDITRACT LLC, INTERLIANT, INC. | HOSTING SERVICES AGREEMENT INFORMATION TECHNOLOGY | JUNE 1, 2000/ MAY 31, 2001 |
| 9501.31C | MEDITRACT LLC, BCBS OF TN | GROUP INSURANCE POLICY HUMAN RESOURCES | SEPTEMBER 1, 2000/ AUGUST 30, 2001 |
| 9501.37C | MEDITRACT LLC, MSA INC. | EQUIPMENT LEASE (OFFICE) FINANCE | JUNE 14, 2000/ JUNE 13, 2001 |

*FIG. 17 (CONT)-1*

AUTO RENEWAL

⇦ PREVIOUS ⇨ NEXT  ✢ EXPAND  ⊟ COLLAPSE  🔍 SEARCH

| CONTRACT NUMBER | CONTRACTING ENTITY/VENDOR (OTHER PARTY) | DESCRIPTION/DEPARTMENT | ORIGINAL DATE/ EXPIRATION DATE |
|---|---|---|---|
| 9501.4C | MEDITRACT LLC, UAB HEALTH SYSTEM | SOFTWARE LICENSE & SERVICE AGREEMENT, OPERATIONS | JULY 18, 2000/ JULY 17, 2001 |
| 9501.50C | MEDITRACT LLC, MEMORIAL HEALTH SYSTEM | SOFTWARE LICENSE & SERVICE AGREEMENT, OPERATIONS | APRIL 25, 2000/ APRIL 24, 2003 |
| 9501.58C | MEDITRACT LLC, NORTH MISSISSIPPI HEALTH SERVICES | SOFTWARE LICENSE & SERVICE AGREEMENT, OPERATIONS | JANUARY 13, 2000/ JANUARY 13, 2002 |
| 9501.59C | MEDITRACT LLC, HEALTH SHARE/THA | HOSPITAL ASSOCIATION AGREEMENT MARKETING & SALES | MAY 19, 2000/ MAY 18, 2003 |

TractManager
◆ CONTRACT DATABASE
  Medical Demo
  ⊕ CONTRACT FILTER
  ⊕ CONTRACT
  ⊕ PARTY
  ⊕ LOCATION
  ⊕ DATES
     ORIGINAL
     EXPIRATION
     MY EXPIRRATION DATE
     AUTO RENEWAL
  ⊕ CRITICAL ISSUES
  ⊕ CRITICAL LIST
  ⊕ STATUS
  ⊕ NEW CONTRACT
  ⊕ Vendor Directory ◀WORK FLOW▲
HELP
Get Adobe Reader

CONTRACT NUMBER: 9501.45C
CONTRACTING ENTITY: MEDITRACT LLC
VENDOR (OTHER PARTY): HEWLETT-PACKARD
CONTRACT TYPE: EXPIRATION DATE UNKNOWN
CONTRACT EXPIRES IN: 582 DAYS
SITE: CHATTANOOGA OFFICE
DEPARTMENT: INFORMATION TECHNOLOGY
GROUP:
PRODUCT:

PRINTED ON 11/24/2000

STATUS IS ACTIVE

ORIGINAL DATE: 06/60/2000
EXPIRATION DATE: 06/29/2002
ORIGINAL TERM: 2 YEAR TERM
USER SIGNATORY: SCOTT JEFFERY, VP OPERATIONS
DESCRIPTION: LEASE FOR 19 HP 9100C DIGITAL SENDERS

PRIMARY: SCOTT JEFFERY, VICE PRESIDENT
SECONDARY: MIKE DRAWBAUGH, VICE PRESIDENT
OTHER SIGNATORY: JOHNNY ALVAREZ
VALUE/RATE:

CRITICAL ISSUES:

| CRITICAL ISSUE | CRITICAL DATE |
|---|---|
| WARRANTY EXPIRATION | 06/60/2001 |
| EXERCISE PURCHASE OR RENEWAL OPTION | 04/30/2002 |

CONTRACT INFO (NAME & PHONE)    COMMENTS

ADDENDA, EXHIBITS AND AMENDMENTS:

TITLE
APPLICATION FOR LEASE FINANCING

ASSETS:
ASSET NAME/    S/N    DEPARTMENT/
DESCRIPTION:          ASSET LOCATION
                      (ADDRESS)

KEY TERMS:
THIS IS OUR INITIAL LEASE WITH HP. THE EQUIPMENT COVERED BY THIS LEASE INCLUDES 14 HP 8100C DIGITAL SENDERS AND 5 HP 9100C DIGITAL SENDERS. THE 14 8100s WERE ALL PLACED AT CLIENTS' LOCATIONS AND THE 5 9100s ARE BEING USED BY OUR SCAN TEAMS.

FIG. 33

DOCUMENT MANAGEMENT SYSTEM FOR SEARCHING SCANNED DOCUMENTS

CROSS REFERENCE TO RELATED APPLICATIONS

This application is a continuation of U.S. patent application Ser. No. 11/142,257, filed Jun 2, 2005, now U.S. Pat. No. 7,194,677, which is a continuation of U.S. patent application Ser. No. 09/748,105, filed Dec. 27, 2000, now U.S. Patent No. 6,957,384.

FIELD OF THE INVENTION

The present invention relates to a method and system for storing, organizing and providing remote access to documents over the Internet.

BACKGROUND OF THE INVENTION

Computers provide access to stored documents that otherwise would be impossible or impractical to obtain. For example, computers can manipulate data and carry out processes that may be possible for people to carry out but could require extended periods of time, such as on the order of years or a life time, to carry out. Alternatively, dozens of people would be required to carry out the functions.

One example of a process that can be carried out quickly with a computer includes word-processing. Changing the text of a document with a word processor eliminates the need for retyping an entire document. Additionally, computers make it possible to search for the location of a single word in the text of document or collection of documents. To search each word of a document or documents that could include thousands of pages and perhaps millions of words would be impossible for all practical purposes. One person may not be able to carry out such a task in a lifetime or many people would need to spend long periods of time carrying out such a task.

Other processes that computers can carry out include maintaining inventory, on-line business transactions, such as auctions, and mathematical modeling. Just as with the text searching function, while it may be possible for people to perform these functions, the computer makes such activities practical by carrying them out in short periods of time. Actually, many if not most of the functions performed by desktop computers would be just as impractical or impossible as larger complex described above.

With respect to on-line activities, the Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a hypertext Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that effects the requesting of Web pages and the displaying of Web pages.

Currently, Web pages are typically defined using hypertext Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

Although computers can greatly facilitate many tasks, the computers require programming and input. With text searching functions, unless the text is accurately input and a search engine available, the computer may be useless. Tools that make the computer useful are as essential as the computer itself.

SUMMARY OF THE INVENTION

The present invention relates to organizing and providing access to documents in a way that greatly facilitates storage and organization of the documents and information concerning and contained in the documents. Additionally, the present invention provides users access to the documents that far surpasses known systems and methods.

In accomplishing the above and other objects and advantages, the present invention provides a method for storing, organizing and providing remote electronic access to documents. A cover sheet including a standard set of identification data characterizing each document is stored. A digital version of each contract is created and stored by scanning each document. Each digital version includes a scanned image and a searchable a text file. The text is overlaid with the image. An index of bookmarks identifying sections of the digital version of each document is generated. Selected fields of information are captured from the digital version of the document. The documents are organized and cross-referenced in a database comprising the captured information and additional information related to each document. Alerts are generated and sent to designated parties reminding them of critical dates associated with each document. Remote electronic access to the documents is provided over the Internet. One particular embodiment provides a method for storing, organizing and providing remote electronic access to contracts.

Additionally, the present invention provides a computer program product for performing a process of storing, organizing and providing remote electronic access to documents. The computer program product includes a computer readable medium and computer program instructions, recorded on the computer readable medium and executable by a processor. The instructions develop and store a cover sheet including a standard set of identification data characterizing each document, and create and store a digital version of each contract by scanning each document. Each digital version includes a scanned image and a searchable a text file. The text is overlaid with the image. The instructions also generate an index of bookmarks identifying sections of the digital version of each document and capture selected fields of information from the digital version of the document. Additionally, the instructions organize and cross-reference the documents in a database that includes the captured information and additional information related to each document. Furthermore, the instructions generate alerts to designated parties of critical dates associated with each document and provide remote electronic access to the document over the Internet.

Furthermore, the present invention relates to a system for performing a process for storing, organizing and providing remote electronic access to documents. The system includes a processor operable to execute computer program instructions and a memory operable to store computer program instructions executable by the processor. The instructions develop and store a cover sheet including a standard set of identification data characterizing each document and create and store a digital version of each contract by scanning each document. Each digital version includes a scanned image and searchable a text file. The text is overlaid with the image. The instructions also generate an index of bookmarks identifying sections of the digital version of each document and capture selected fields of information from the digital version of the document. Additionally, the instructions organize and cross-reference the documents in a database that includes the captured information and additional information related to each document. Furthermore, the instructions generate alerts to designated parties of critical dates associated with each document and provide remote electronic access to the document over the Internet.

Still other objects and advantages of the present invention will become readily apparent by those skilled in the art from a review of the following detailed description. The detailed description shows and describes preferred embodiments of the invention, simply by way of illustration of the best mode contemplated of carrying out the present invention. As will be realized, the invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which:

FIG. 1 illustrates an embodiment of a coversheet according to the present invention;

FIGS. 2-33 represent web pages that illustrate aspects of a document management system according to one embodiment of the present invention.

DETAILED DESCRIPTION OF THE INVENTION

Figure 9:
Figure 10:
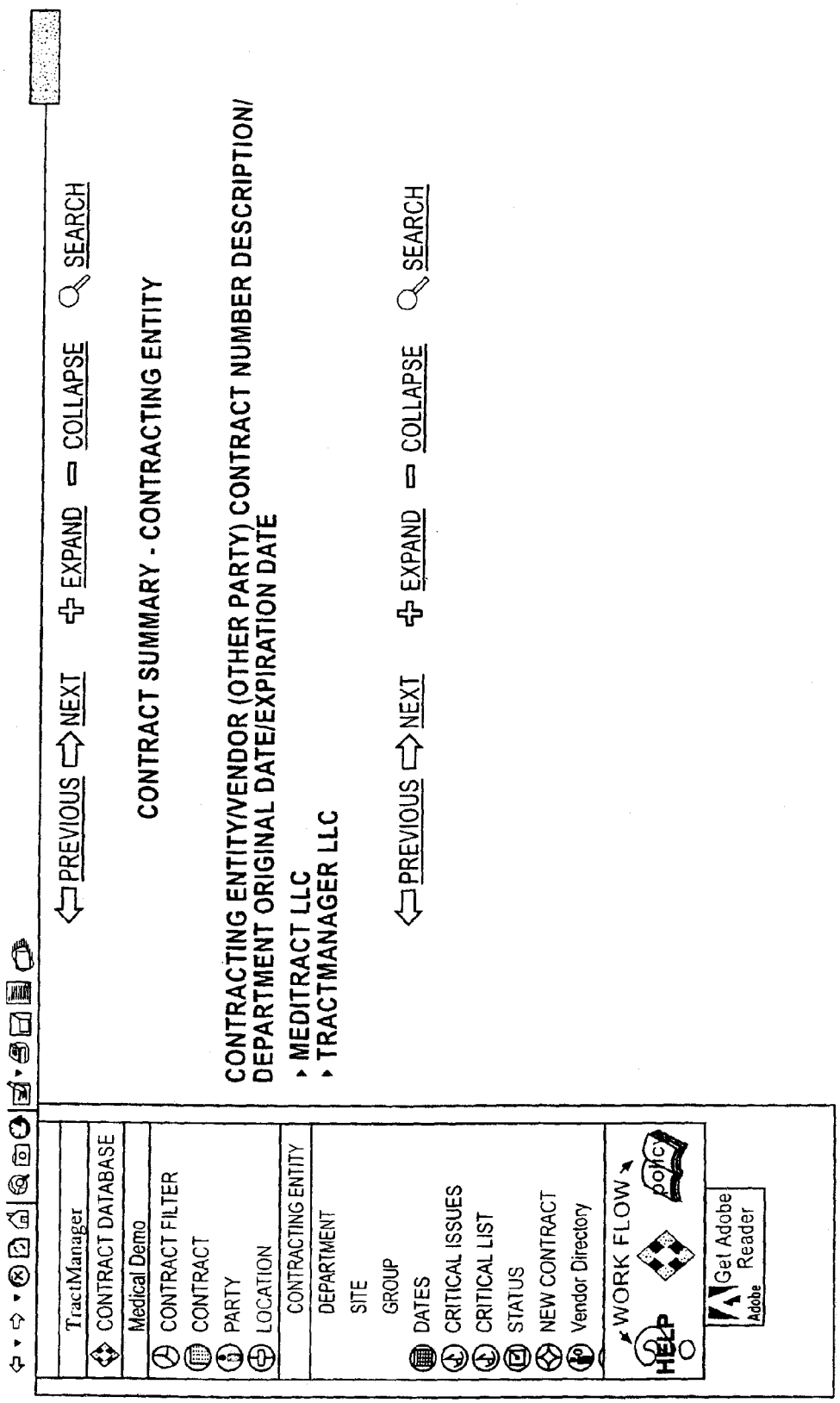
Figure 11:
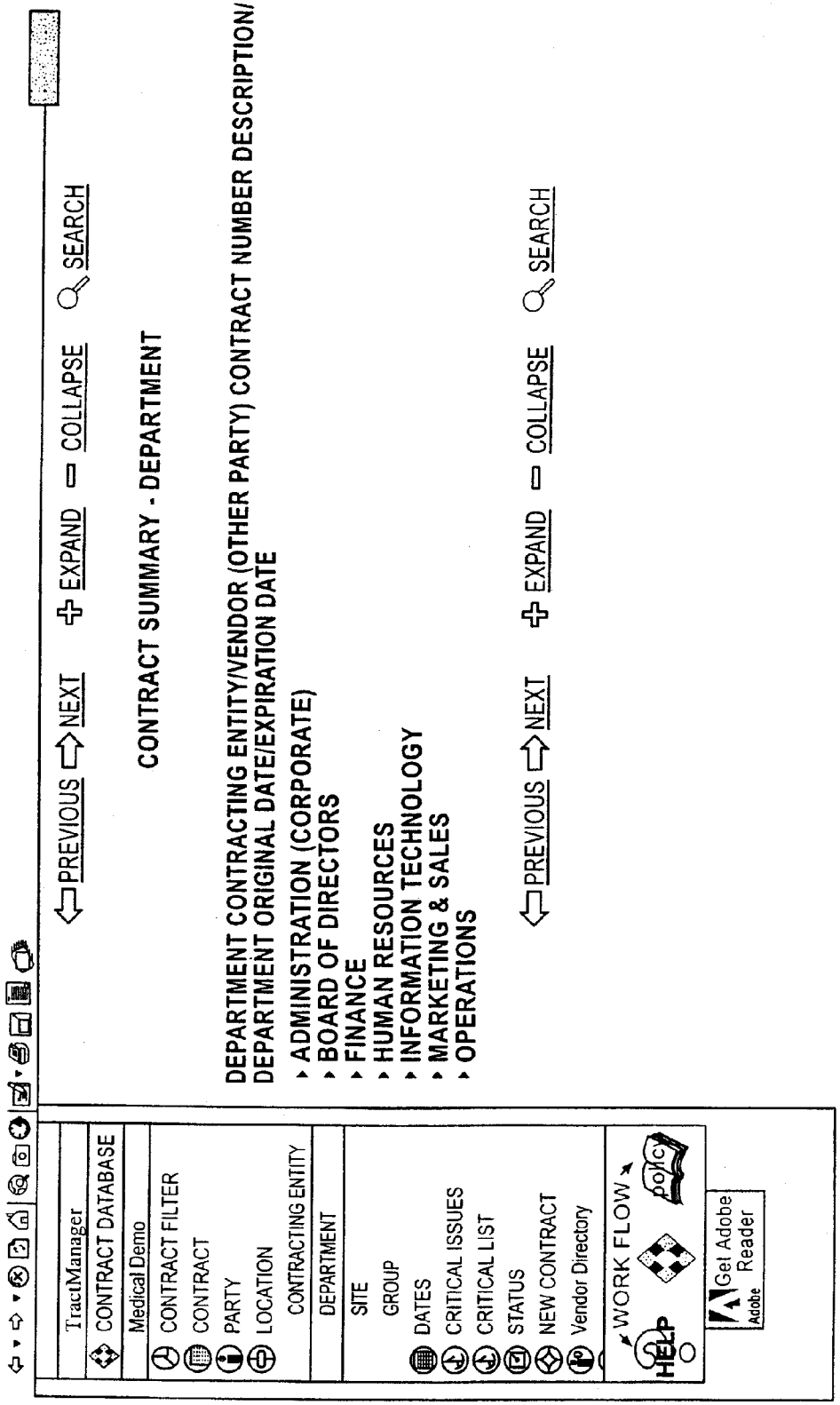
Figure 13:
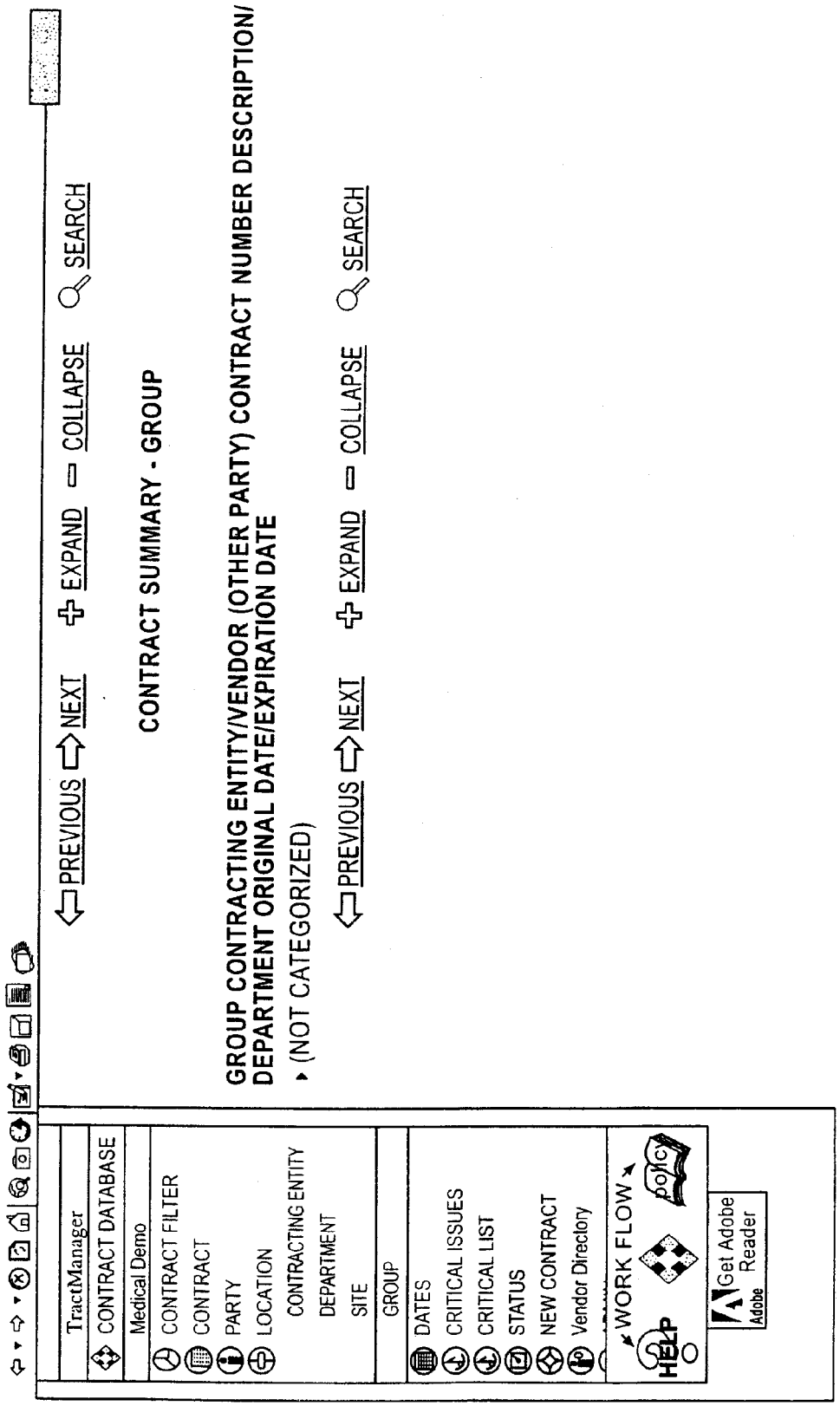

The present invention facilitates document management and access to an unrivaled and heretofore unknown degree. The management and access is made possible by the process for handling the documents and associated data according to the present invention. Advantageously, the present invention is applicable to management of a wide variety of document types. The broad application of the present invention stems in part from process steps that can be sufficiently generic that they can be applied to many types of documents. Another advantage of the system and process are their flexibility and capacity for customization, which can permit the present invention to be tailored to particular types of documents. While particular aspects of the present invention may be discussed below in relation to contract management and access, it should be kept in mind that the present invention may be applied to other documents. Of course, since just about any agreement can be considered to be a contract, even when only considering contracts, the present invention can be used to organize leases, employment contracts, purchasing agreements, permits, articles of incorporation, and any other type of agreement.

An embodiment of a method according to the present invention starts with developing and storing a cover sheet that includes a standard set of identifying data characterizing each document. The cover sheet may be customized for the particular type of documents being handled. For example, if the method is being used for contracts, the cover sheet could be include information such as contract type, contracting site, contracting department, contracting entity, responsible parties, authorized users and/or any other information.

To facilitate storage of the coversheet, a list of alternatives may be developed for each piece of information in the coversheet. Each alternative may be assigned a number. A coversheet entry form may be developed that includes each piece of information and the alternatives. The coversheet can then be generated by a user indicating which alternative relates to each document. The user may perform this action by circling a number, checking a box, filling in a space or through another action. By generating the coversheet in this manner and having a user complete the coversheet as described, the coversheet may be scanned, greatly facilitating the process. In may be desirable that a few of the scanned coversheet data be compared with the scanned coversheets and/or with the actual documents to verify accuracy of the scanned information as well as the information entered by the user on the coversheet.

FIG. 1 illustrates an example of a coversheet according to the present invention. As FIG. 1 shows, a coversheet may include a plurality of categories with a plurality of options under each category. The example of a cover sheet shown in FIG. 1 relates to contracts. In this embodiment, a user could circle the relevant option under each category. Other embodiments could include a sheet with a plurality of bubbles that a user could fill in, similar to a standardized test. Any form could be utilized. Typically, the form is machine readable to enhance the automation of the process. Naturally, if the documents are other than contracts, the categories could differ from those shown in FIG. 1. However, even if the documents are contracts, the categories could differ.

This is one of the great advantages of the present invention. For as soon as the coversheet is created and stored, important data concerning each document will be present in a computer memory. To begin the process of organizing the documents and the associated data, each document may be assigned a document number by a computer being utilized for the process. The coversheet data as well as later entered data can be associated with the number to facilitate access to the documents. Additionally, each document can be cross-referenced with the coversheet data as described below.

Furthermore, after entry of the coversheet information, the computer being utilized can search databases of additional information for each element that constitutes the coversheet. For example, if the document is a contract and the responsible party is one element that the coversheet includes, then the computer could retrieve additional previously stored information concerning that party and associate the additional information with the document record. In the case of a responsible party, the additional information could include an electronic mail address, a street address, a telephone number, and/or any other piece of information.

After the process of automatically entering the coversheet data, the documents may be scanned. Scanning the documents permits a digital version of each document to be created. Each digital version includes a scanned image of the document such that the actual appearance of each document is captured. Also, after each document is scanned, a searchable text file is created and overlaid with the image. This may be carried out utilizing Adobe Capture 3.0, available from Adobe Corporation. In this way, a user may search the text of the document and have the location of the text indicated on the scanned image. This can greatly facilitate use of the present invention and retrieval of information.

After scanning of a document, at least one bookmark may be generated to facilitate searching of the information in the digital version of the documents. The scanned document may be automatically analyzed to generate an index. Bookmark locations may be identified by a number of different criteria. Typically, the criteria are selected to increase the probability that the occurrence of the criteria will correspond to the location of a section where it would be desirable to have a bookmark. For example, bookmark criteria could include changes in font, changes in font size or style, the beginning of a new paragraph or any other desired element. This may also be carried out utilizing Adobe Capture 3.0 available from Adobe Corporation. The processing carried out with this program may be enhanced through manual input and editing to create, delete, and edit bookmarks.

The bookmarks may be identified by the text that occurs in the location where the criteria is identified. In other words, if the criterion is a font change, then the first word or few words beginning at the font change may be used to identify the bookmark. After identification, the bookmarks may be reviewed to determine their accuracy in terms of placement and/or any other basis. Bookmarks may also be deleted. For example, perhaps every term defined in a "definitions" section of a contract is identified as a bookmark. However, it may be desired to only identify the certain definitions in the document index. Therefore, some terms may be deleted. Additionally, the criteria may identify locations in a document that do not correspond to locations where it is desired to have a bookmark. These locations may also be deleted from the index.

In the case of a contract, different sections of the contract may form a bookmark location. Other documents would have bookmarks corresponding to different sections. After creation of the index, the bookmarks may be displayed with a document or alone. However they are displayed, the bookmarks may provide hyperlinks to the locations in the document that they correspond to. This will be discussed in greater detail below.

After generating bookmarks, information may be captured from the digital version of a document. If information is captured, the information captured can depend upon the nature of the document. For example, in the context of a contract, the names of the parties to the contract, the date of the contract and the term are examples of information that may be captured. Information captured from the digital version of a document may provide a means of cross-referencing and searching the document. By searching existing databases of vendors, for example, the information captured from the digital version may be linked to further information. Along these lines, additional information about a vendor could be accessed as described below.

Once the document coversheet is developed and stored, the digital version of the document is created, the documents may be organized and cross-referenced in a database. In the context of contracts, information associated with the contracts can include the reference number, contracting party, vendor, contract date, contract expiration date, department, contract type, contracting site, responsible party, parties authorized to have remote electronic access to the document, contract signatory, contracting group, contract value, contract status, contract critical dates, and/or assets related to contract. Of course, additional or other information related to the contracts may be included in the database. In the context of other documents, the information may change. However, the information and descriptions thereof may be substituted for the information that may be related to contracts.

Regardless of the nature of the documents and the information and descriptions, cross-referencing of the documents can permit location of related documents. For example, the vendor name listed for a contract could provide a link to all contracts for that vendor. Other information may also be linked to a document. For contracts, other information that the contracts could be cross-referenced by could include notes concerning the contracts, documents related to a contract, contact or other information for a party to the contract, critical dates, assets related to a contract, selected terms of the contract, and/or any other information. The other information linked to a contract could itself be linked to further information that the contracts may or may not be cross-referenced by. Examples of further information can include other contracts related to an asset, other contracts with a corresponding critical date, information characterizing a linked asset, and/or any other information.

The documents may be further linked to additional information regarding the documents and/or information associated with the documents may be further linked to additional information. For example, in the context of contracts, the contracts may be linked to vendor information. As described below in greater detail, if accessing a contract provides the name of the vendor or a link to the vendor, the vendor name could then provide a link to contact information for the vendor. Cross-linking the documents in a number of ways, such as through related information permits the present invention to provide unparalleled access to the documents.

With respect to contracts or any other documents that have related time and/or date, the present invention can generate alerts to designated users. The dates may be captured from the document when scanned or entered manually. Then, the system captures the date and automatically generates alerts to one or more designated users at designated intervals. In the context of contracts, the expiration date is a relevant date. Alerts of the expiration date may be sent every three months for six months prior to expiration and then every day for the final week. Of course, any interval may be utilized with any associated critical date.

Acquisition of the coversheet and document information may take place anywhere. Typically, the coversheets and documents are acquired at a user's location. The coversheets and documents may be stored on a computer storage device located at the user site. After acquisition, the documents and coversheets may be transmitted to a central location for further processing. Alternatively, the documents and coversheet information may be transmitted via electronic mail as they are acquired.

After acquisition of the documents and coversheets, the associated files may be stored on a server. Optical character recognition (OCR) may be carried out on the files as a batch process. Similarly, the files may be batch processed for bookmark creation. To help verify the OCR and/or bookmark creation, manual verification may be carried out after the batch processing. The scanned image of the documents may be overlaid with an OCR file representing the text of the document at this time. The OCR file typically is a read-only file to avoid alterations to the text, thereby helping to ensure that the OCR file and the image of the document correspond.

A significant aspect of the present invention is the provision of remote access to documents. The remote access typically is over the Internet. However, the present invention could provide the remote access through other means, such as a connection with a user. However, the Internet typically can provide the most easily accessible and widest available access to the documents.

With remote access comes the issue of authorization to the documents. The present invention can limit access to users to provide a variety of degrees of access to the documents. The access can be controlled by providing a list of users and the degree to which each user will have access. The access may be defined by the amount of information a user may access. The access may also be defined by the ability to edit, print and/or download information. Other examples of factors that can define a user's access to the system can include the ability to attach information to a document and/or edit information already attached to a document record. Additionally, access may be defined by the ability to create and edit a document summary page and to make global changes to summary pages related to all documents. Also, the ability to archive a document may form one factor that defines access to the system. Still further, the ability to enter and edit critical dates can define access as can the ability to enter and edit assets attached to a document. The ability to create, alter, and/or delete a vendor and/or vendor information can define access. Moreover, the ability to be named as a responsible party related to a document can be a factor in defining the degree of user access. Furthermore, access can be defined by the ability to create, edit and/or delete users. While any one or more of the above elements may be utilized to define the degree of access a user will have to a system, any other factor may also be employed.

To control access to the documents that are managed by the system of the present invention, a user typically will be required to present a password to access the system. Users may also have a user name that they may be required to present. A user will first direct a web browser to the URL for a site that provides access to the system according to the present invention. Typically, the access site will present the user with a plurality of options. For example, the access site may also be accessible by non-authorized users for the purpose of obtaining information about the system.

When authorized users arrive at the access site, the access site may include spaces for entry of the user name and password. Alternatively, the access site may provide a link to a login site, a pop-up window, or any other means that provides a login opportunity. In any of these cases, a user will type in the password and possibly user name as well.

After verifying the user's password and possibly user name correspond to an authorized user, the system will determine the degree of access associated with the user. Some embodiments of the invention will then present authorized users with a selection screen that permits the user to select various options by providing links to sites such as a library of the documents being handled for the user, a communication program, and a workflow manager that permits exchange of documents for review and comment. FIG. 2 provides an example of a selection screen. The workflow manager will be discussed in greater detail below.

Upon selecting the library of documents, such as by clicking a mouse button when the cursor is over the appropriate active link, the system will display a document filter page. FIG. 3 provides an example of a document filter page. While the document filter page shown in FIG. 3 relates a system for managing contracts, the same page may be altered when dealing with other documents that have other associated attributes.

The document filter page can include one or more pull down menus and/or one or more boxes for entering search terms. The pull down menus may include options that form categories on the cover sheet. For example, the document filter page shown in FIG. 3 includes pull down menus for contracting entity, contracting site, department, and contract type. Each of these categories could be on the coversheet. Each pull down menu, when pulled down, could display all of the options for each category. For example, if the contracts were contracts of a hospital, the "department" pull down menu could display all departments, such as cardiology, emergency room, admissions, and so on. If other documents are being handled, other pull down menus with other options may be utilized.

Selecting one of the members on a pull down menu can display all documents that correspond to the particular member selected. For example, every contract relating to a particular department may be displayed if a particular department is selected. In some cases, a user may desire to make a selection from more than one pull down menu to find particular documents. The present invention permits this to be carried out.

In addition to searching by document attributes, the present invention permits searching documents by certain keywords. The keywords could be used to search for words occurring in the text of the alternatives listed in the pull down menu options. The keyword search could be utilized in place of or in addition to the document attribute pull down menus.

In addition to searching for documents by attribute and/or attribute keyword, the present invention can also permit searching for documents by keywords that occur in the text of the documents. The lower half of the document filter web page shown in FIG. 3 includes a box for entry of text for a keyword search. As can be seen in FIG. 3, in the context of contracts, contract and vendors represent two options where a keyword search may be carried out. The number of documents revealed by a keyword search may be varied. The document filter web page shown in FIG. 3 includes a pull down menu for specifying the number of documents a keyword search will reveal. The maximum number of documents pulled up by a keyword search may be indicated in other ways, such as by clickable buttons such as those shown for designating whether contracts or vendors are to be searched in document filter web page illustrated in FIG. 3.

Searching may also be carried out using word variants. If it is desired to offer such an option, the document filter web page shown in FIG. 3 can include a box to check as shown. The present invention may also offer the possibility for conducting a "fuzzy" search, which can expand a search to similarly sounding words or similarly spelled words or other alternatives. If it is desired to offer a fuzzy search option, the document filter web page shown in FIG. 3 can include a box to check, as shown.

Regardless of the type of search being carried out, the web page may include an active "search" button for a user to click on to initiate a search. The document filter web page represented in FIG. 3 includes such a button.

In addition to displaying search options, the search page may also display a pane that includes a menu of options for displaying documents. The menu may be expandable. The cross-linking of the documents that occurred during the storage of the documents and document information may be employed with the display menu.

FIG. 3 illustrates a display menu for a system for dealing with contracts, in particular. The menu shown in FIG. 3 includes options to display contracts based upon various characteristics. The search options in the page shown in FIG. 3 include contract, party, location, dates, critical issues, critical list, and status. The list also includes other options that do not relate to searching the contracts. These include new contract, vendor directory and administrative options. Clicking on one of the options can display all contracts with the selected attribute.

Under each of the search options shown in FIG. 3, a number of sub options may be included. For example, the contract option may include contract number and contract type. Clicking on contract number will result in the system displaying all contracts by number. FIG. 4 illustrates a web page showing such results. Clicking on a contract number results in display of information regarding a particular contract as discussed below in greater detail. As can be seen in FIG. 4, the pane with the search options will still be displayed when viewing contracts or other documents of a particular type.

On the other hand, clicking on contract type results in the display of all of the types of contract that the particular user has entered into. FIG. 5 shows an example of contract types. Clicking on one of the contract types will expand the particular type to list all of the contracts of that type. Once all contracts of a particular type have been displayed, similar to the list in the web page shown in FIG. 4, a particular contract may be selected for viewing.

As shown in FIG. 6, the "party" search option may include a number of sub options for searching. These can include signatory, other signatory, responsible party, and vendor or other party. Similar to contract type discussed above, clicking on one of the sub options will result in the system displaying contracts corresponding to the sub option. Along these lines, FIG. 6 illustrates a web page showing all contracts for particular signatories. In this case, the signatory could be clicked on to reveal all contracts that the signatory has signed or also has any other connection to. Along these lines, a signatory could be a responsible party for a contract whether or not the party has signed the contract. Clicking on a particular contract shown in FIG. 6 will lead to viewing information about the particular contract.

Listing of contracts as shown in FIG. 6 can also include information concerning the contracts. Along these lines, the web page shown in FIG. 6 has been set up to display signatory, contracting entity, vendor or other party, contract number assigned by the system, nature of the contract, contracting department, original date, and expiration date. Any other information could additionally or alternatively be displayed on this page. For example, a subset of the information shown in FIG. 6 could be displayed.

As shown in FIG. 6, any web page displayed by the present invention may include navigation aids, such as those shown at the top of the page, to go to the previous page, the next page, to expand or collapse the page, or to go back to the filter page to search. Of course, other links may be included. Similarly, the search option page may include links to help information, a workflow manager discussed below in greater detail, a policy statement, or any other element.

Another category under the party search option is "other signatory". This option can list contracts by a second signatory to a contract. The contracts may be displayed and accessed similar to the contracts shown in FIG. 6, as described above, including the additional information shown in FIG. 6. FIG. 7 represents a web page displaying contracts by "other signatory".

Additionally, the party search option may include the possibility to display contracts by responsible party. As discussed above with respect to the coversheet, one or more people may be named as responsible party for a contract. The responsible party may differ from the signatory. Similar to the display of contracts for a particular signatory or other signatory, a responsible party may be listed and all contracts for which that party is responsible also displayed. Alternatively, as shown in FIG. 8, the responsible parties may be listed without the contracts being listed. The display of contracts in FIGS. 6 and 7 could be similar to that shown in FIG. 8, in that only the party could be displayed rather than displaying all contracts. Clicking on the name of a party or an element adjacent the name of the party can result in the contracts being listed under the name of the responsible party. Additional information may be displayed for each contract as shown in FIG. 8. For example, the web page shown in FIG. 8 displays contracting entity, vendor or other party, contract number assigned by the system, nature of the contract, contracting department, original date, and expiration date. The total number of contracts for each responsible party may be displayed independent of whether all contracts are listed for a particular party. Any other information could additionally or alternatively be displayed on this page. Clicking on a contract can result in the display of information concerning that contract as described below in greater detail.

Another category included under "party" that contracts may be displayed by is vendor or other party to a contract. Clicking on "vendor" (the other party in the context of contracts) can result in the system displaying a list of vendors, as shown in the web page illustrated in FIG. 9. Each vendor may be expanded by clicking on the vendor or on a button, such as the arrows shown in FIG. 9, similar to the responsible parties shown in FIG. 8 and discussed above. Display of members of the subcategory of "vendor" could also result in all contracts for a particular vendor being displayed under each vendor. Additional information displayed for the contracts as shown in FIG. 9 may include contracting entity, vendor or other party, contract number assigned by the system, nature of the contract, contracting department, original date, and expiration date. As with the display of contracts discussed above, other information may additionally or alternatively be displayed.

FIGS. 10-13 illustrate subcategories that may be included under the location category found in the search pane. Clicking on any one of these subcategories can result in the display of all contracts related to the particular contracting entity, department, site or group, and information relevant to the contracts. Again, rather than requiring the clicking on a link, the contracts may be displayed similar to the display of contracts related to signatories as illustrated in FIG. 6.

Other relevant information with respect to contracts includes associated dates. The dates may be classified in a number of ways. For example, the original date of a contract, the expiration date of a contract, expiration dates that a particular party is responsible for, dates that certain contracts may be automatically renewed, and any other possible dates may be used to classify contracts. Other dates may be utilized to classify other documents. For example, if the present invention were utilized to organize and provide access to a set of regulations, the effective date of the regulations could be used.

FIGS. 14-17 illustrate web pages that display contracts by original date, expiration date, expiration dates for the user of the system at a particular time, and the renewal date for those with an automatic renewal provision, respectively. As shown in FIGS. 14-16, clicking on the relevant link in the search pane can result in listing contracts by the relevant date along with additional information, such as contracting entity, vendor or other party, contract number, contract type, contracting department, original date, expiration date, and/or any other information. The date can provide a hyperlink to all contracts having the relevant activity on that date. In other words, clicking on a date in the expiration date page shown in FIG. 14 can transport the user to a web page that lists all contracts expiring on that date. If the contract listed in the expiration date page were the only contract expiring on that date, then the date link could transport the user to information for that contract rather than a list since the list would only include that one contract. The web pages shown in FIGS. 14-16 also include hyperlinks to the contracts themselves through the contract number assigned by the system. FIG. 17 illustrates a web page that lists contracts with auto renewal provisions.

Figure 18:
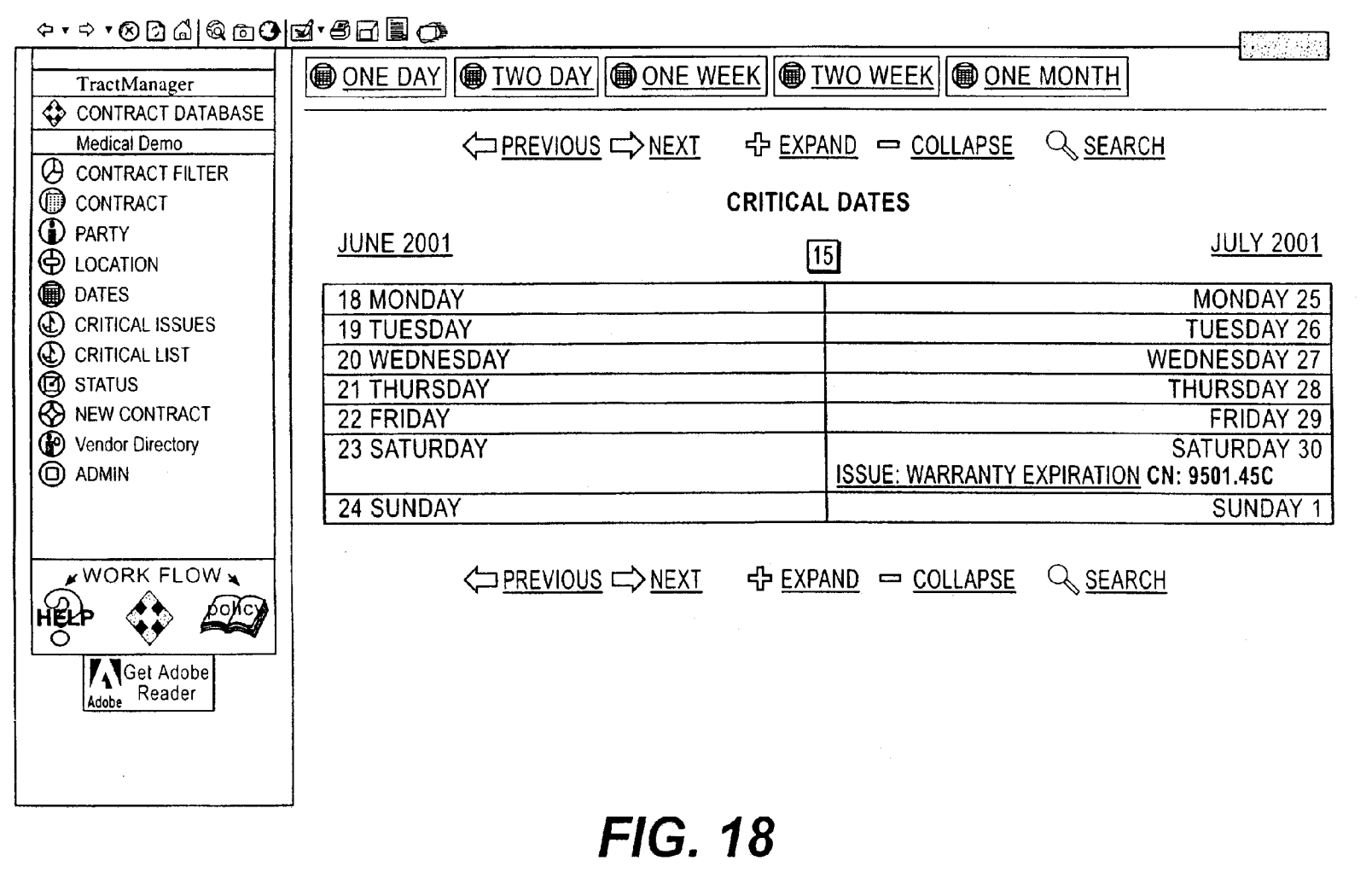

Rather than providing contracts by certain events, the present invention may sort and display contracts or other documents by critical issues and associated dates. FIG. 18 represents an example of a web page that can illustrate critical dates associated with critical issues occurring in a two-week period of time. The issue represented during the time period shown in FIG. 18 is a warranty expiration. Clicking on the issue can transport the user to the relevant portion of the contract. On the other hand, clicking on the contract number can transport the user to the contract information page described below in greater detail. Other issues, including expiration dates could also be displayed as shown in FIG. 18 rather than as represented in FIGS. 14-17.

Figure 19:
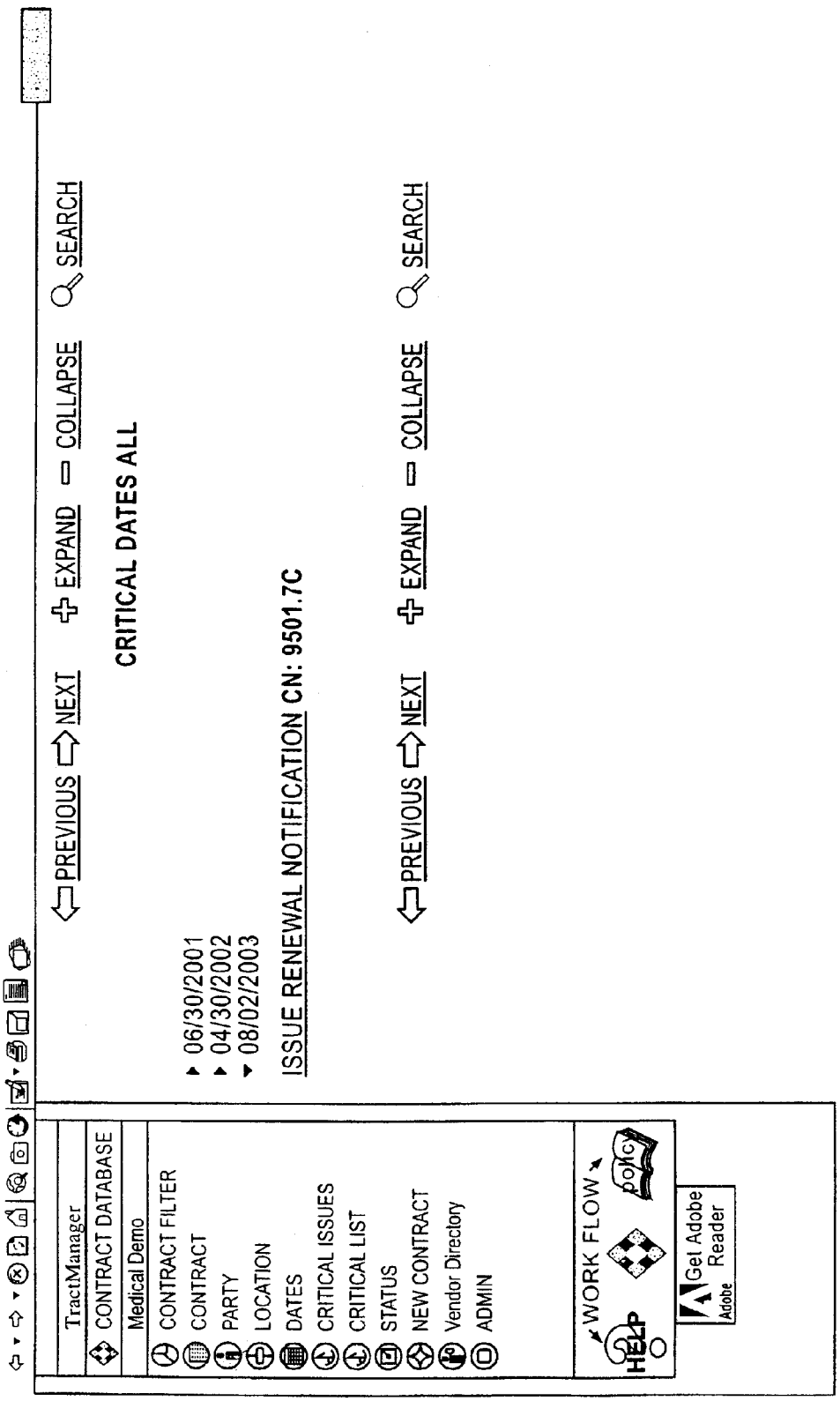

The critical issues page may also include active hyperlinks to a particular month, as shown in FIG. 18. Additionally, rather than display a two-week period, the page may display one day, one week, one month, or any other time period. Along these lines, FIG. 19 represents a web page that displays dates. By clicking on one of the dates or the button next to a date the system can display all critical issues for a particular date. As with the web page shown in FIG. 18, the issue and the contract number may provide hyperlinks to additional information.

Figure 20:
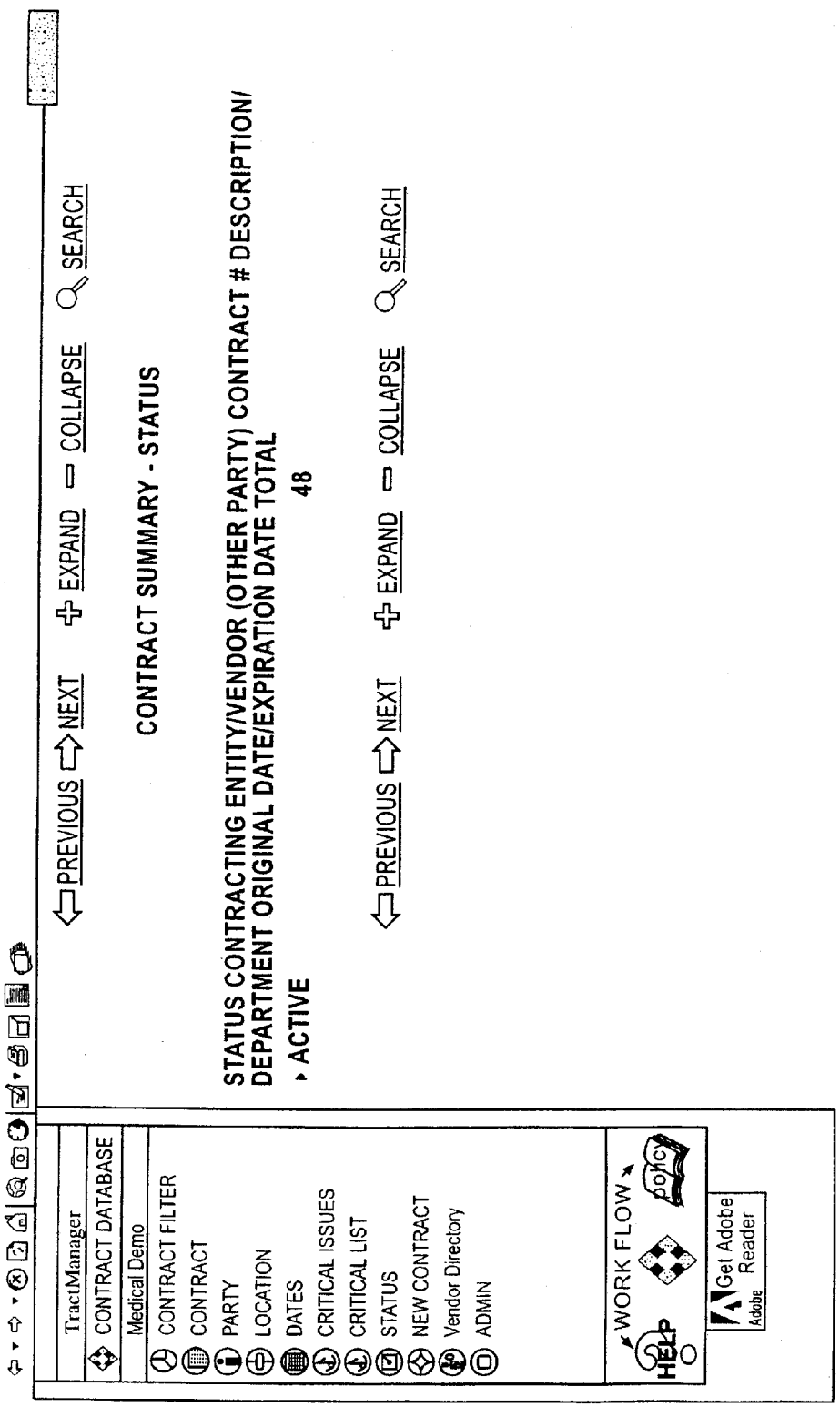

The "status" option in the search pane can result in the present invention finding contracts having certain status. Examples of status can include active, expired, and archived. Once a user clicks on the "status" option, the system will display a list of various options for contract status, such as is shown in the web page represented in FIG. 20. Clicking on a status will result in the present invention determining and displaying all contracts with the status. The present invention may also display information regarding the contracts. Examples of the information can include contracting entity, vendor or other party, contract number, contract type, contracting department, original date, expiration date, and/or any other information. Clicking on a contract number or name or an associated button could transport the user information regarding the particular contract. In any display of information associated with contracts or other documents, clicking on a listed vendor, for example, or other category could transport the user to a page listing all contracts or documents associated with the particular vendor or other category.

Figure 21:
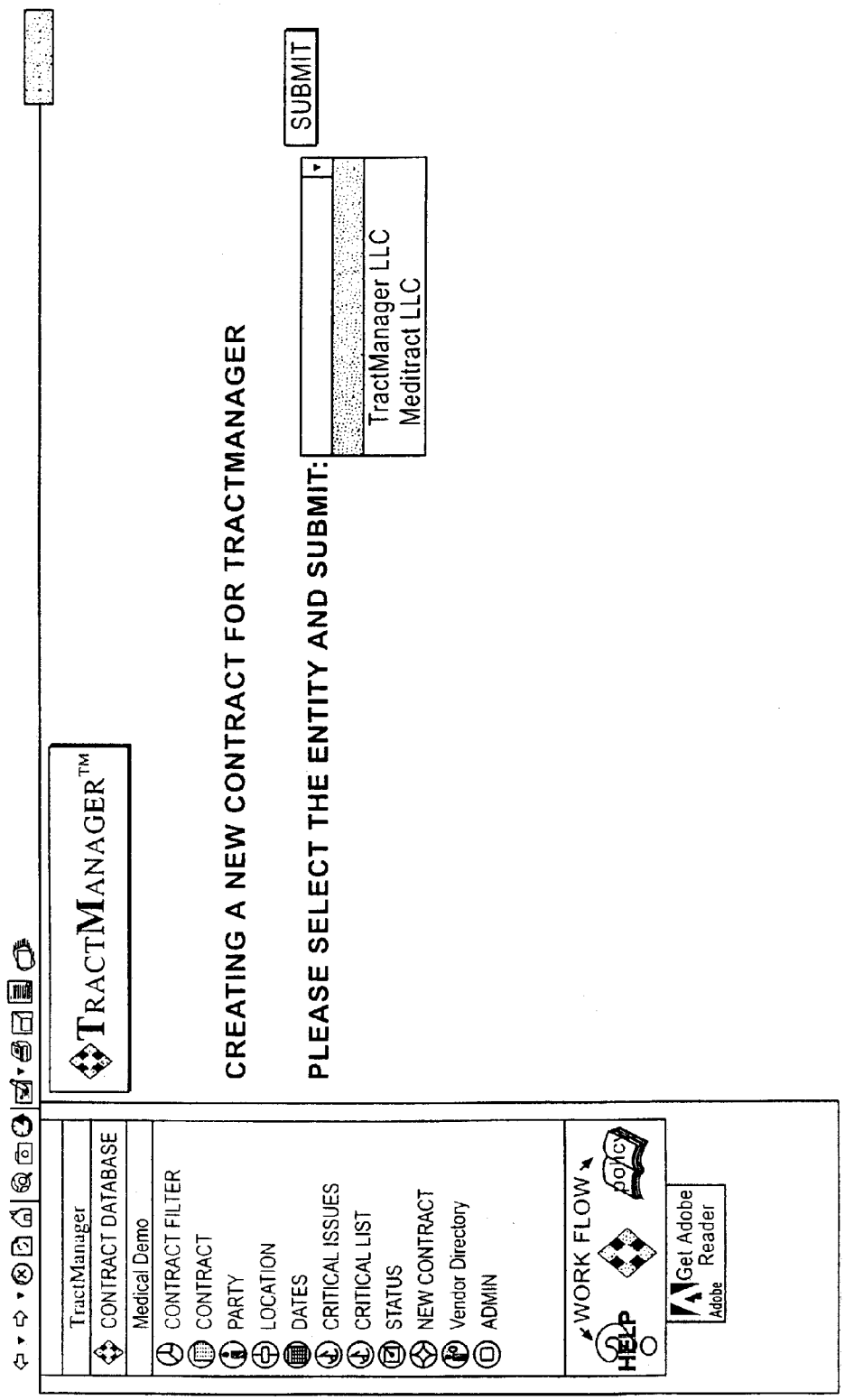

In addition to searching options, the search pane may provide links to other functions. Along these lines, the search pane may provide a link to an option for creating a new document record. The web page shown in FIG. 21 illustrates web page for creating a "new contract" record. The web page represented in FIG. 21 includes a pull down menu for selecting a contracting entity. The new document record page may include means for entering all relevant information, such as text entry boxes. Alternatively, the new document record page may include a button such as the "search" button shown in FIG. 21 that provides a link to one or more web pages that permit the user to enter information about the document record. The linked pages may also prompt the user to scan the coversheet or manually enter coversheet data. Furthermore, the linked pages may prompt the user to scan the new document.

Figure 22:
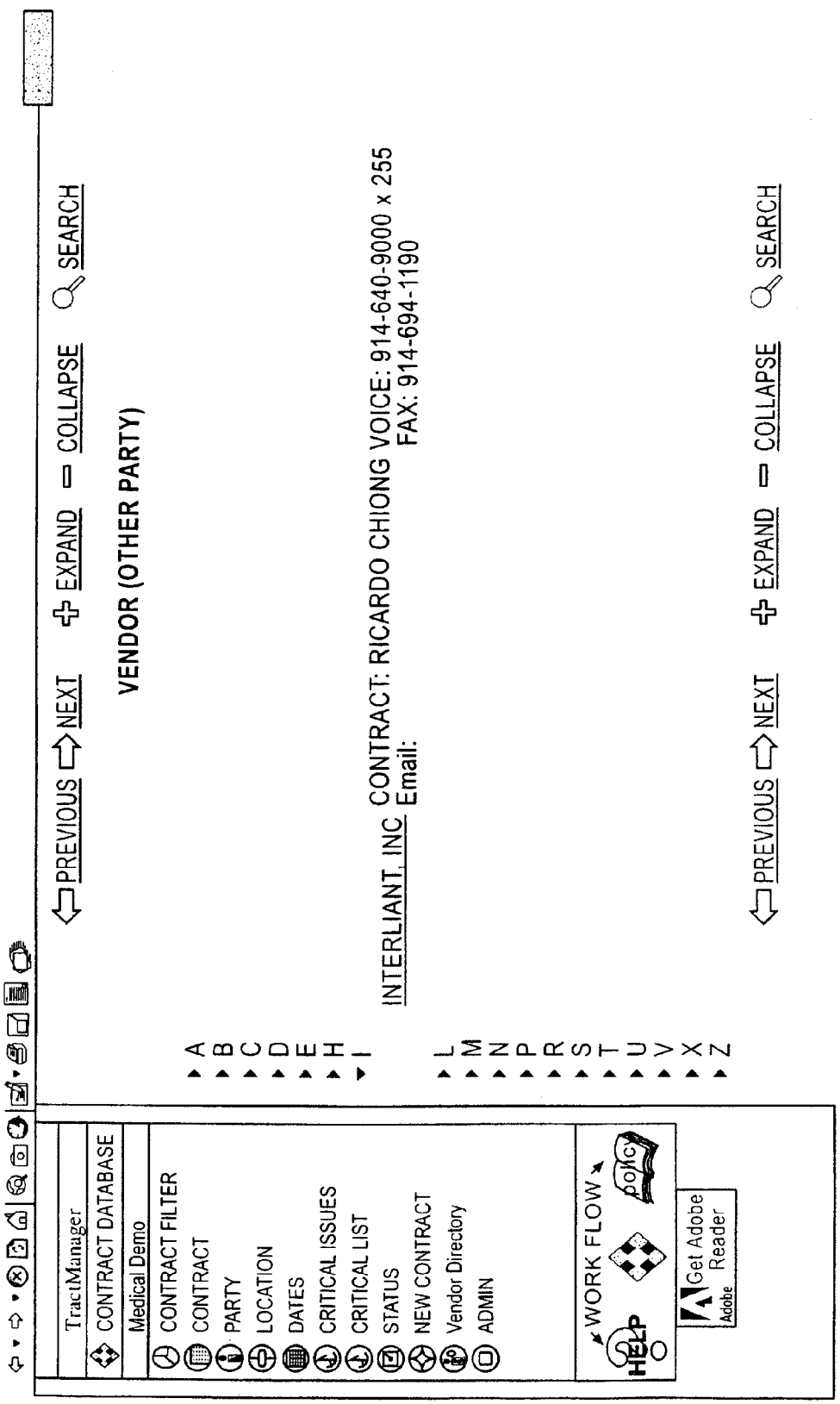
Figure 23:
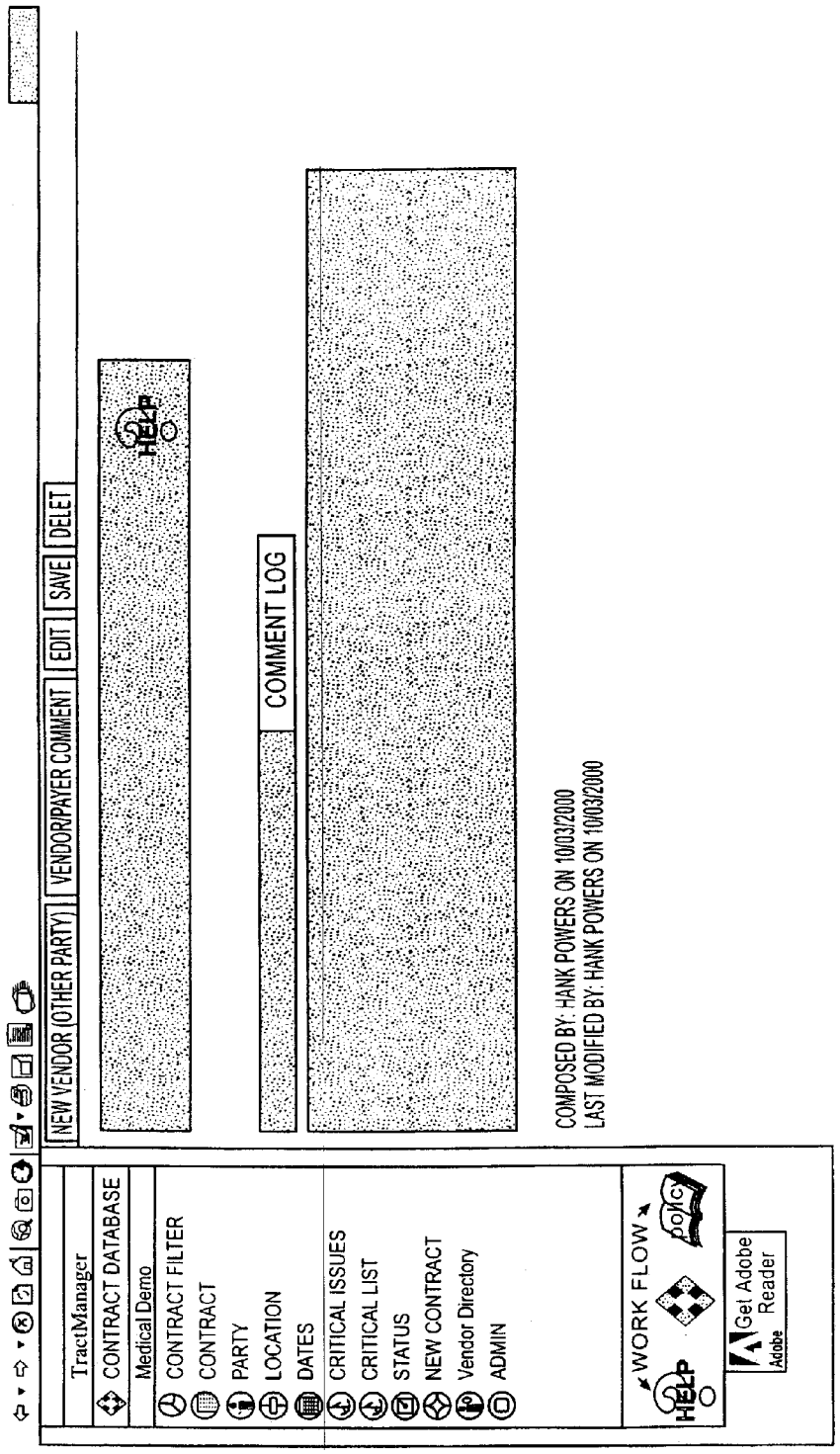

In addition to including a new document record entry option, the search pane may include links to directories of information, such as the "vendor directory" link shown in FIG. 22. The web page shown in FIG. 22 includes an alphabetical link to the vendors. Clicking on a letter or button next to the letter will cause the system to list all vendors beginning with the relevant letter. Clicking on a vendor can transport a user to a page with information about the vendor, such as is shown in FIG. 23. Of course, in the context of other documents, the directory could differ. For example, if the present invention were utilized in connection with a set of regulations, search pane could include a link to a directory of the regulating bodies.

The web page illustrating specific vendor information shown in FIG. 23 includes links to create a new vendor entry, to comments concerning a vendor and/or payer, to edit the vendor information, to save vendor information, and to delete vendor information. Other links could alternatively or additionally be included. Other vendor information could also alternatively or additionally be included.

Figure 24:
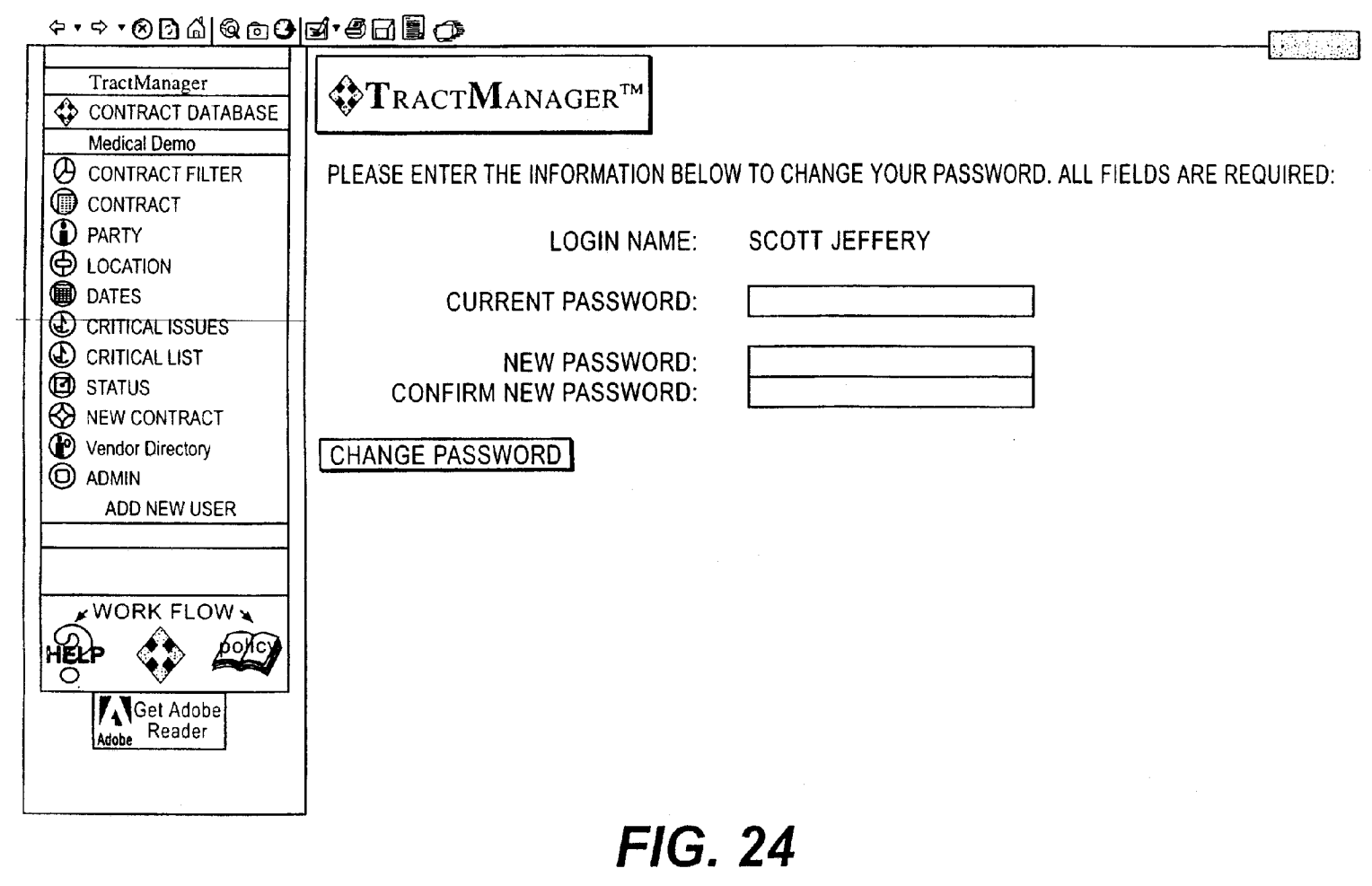

Other functions that the search pane can provide links to include administrative functions. Examples of administrative functions can include adding new users, modifying user access levels, changing passwords, as well as other functions. FIG. 24 illustrates an example of a web page for changing a user's password.

Figure 25:
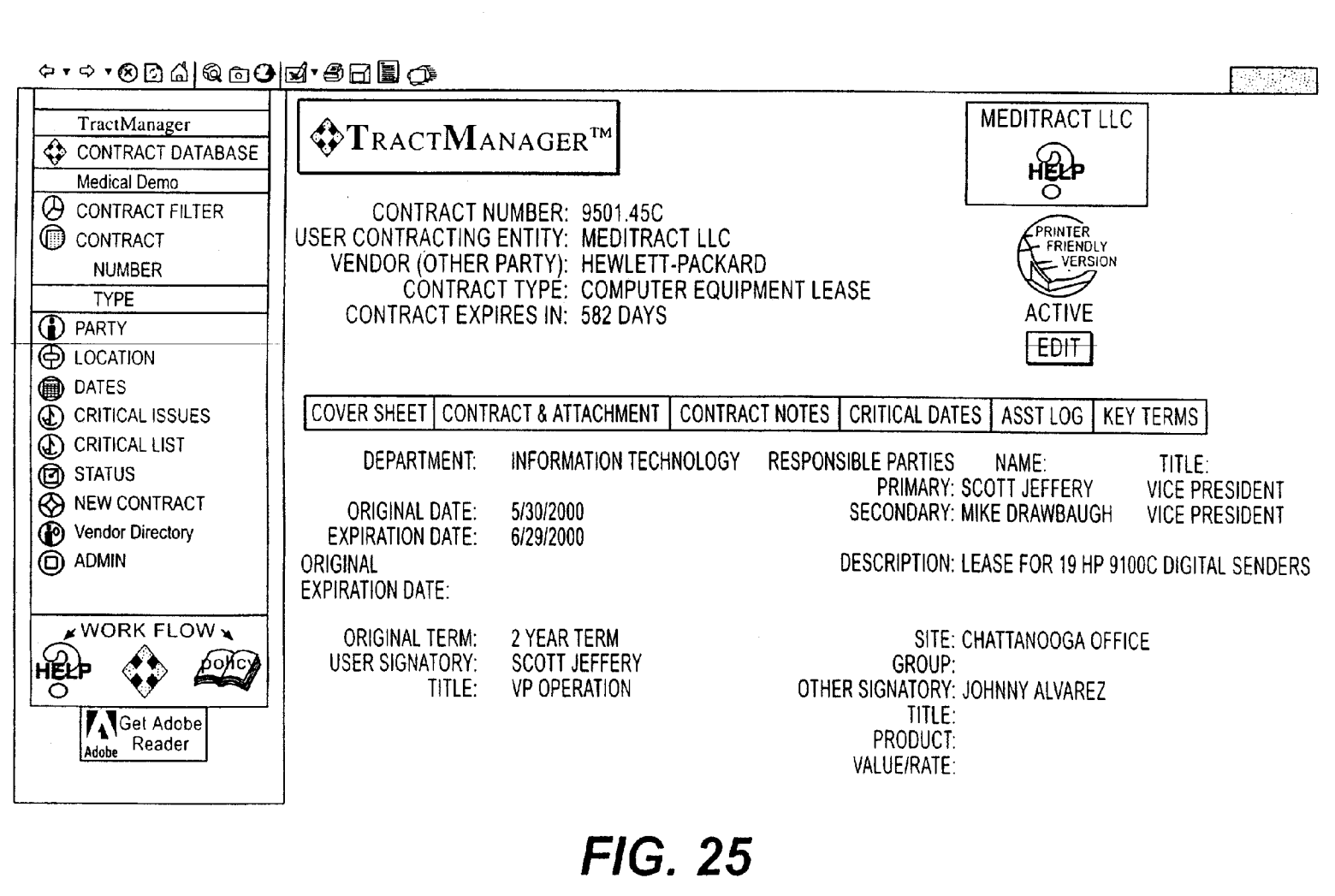

As described above, the once the search has revealed a list of documents, clicking on a document will transport a user to a document summary page. FIG. 25 illustrates an embodiment of a document summary page particular to a contact. While the web page shown in FIG. 25 may be utilized in a system for managing contracts, a similar page may be utilized for other documents. When managing other documents, the titles for various pieces of information may change.

Entries in the heading may provide hyperlinks to additional information. Along these lines, the vendor name may provide a hyperlink to other contracts associated with the vendor. Alternatively, the vendor name could provide a link to information about the vendor, such as contact information. Similarly, the user contracting entity and contract type could provide links to other contracts having the same user contracting entity and contract type.

Typically, the document summary page includes a number of tabs 102 that control the information displayed in a document information pane. The contents of the document information pane may change, depending upon which tab is selected. However, the heading information may remain constant to provide a reference to the user.

Also, the descriptive words on each tab may change, depending upon the type of documents being managed. Along these lines, the tabs for a system particular to managing contracts may have the headings shown in FIG. 25. These headings include "cover sheet", "contract & attachments", "contract notes", "critical dates", "asset log", and "key terms". The information that may be included in each of these headings will be discussed below in greater detail.

The "cover sheet" tab can result in display of the information shown in FIG. 25. While this information may include some of the information in the cover sheet discussed above for the cover sheet described above that may be stored upon the creation of a new document record; it can include the same, less, or more information. FIG. 25 illustrates an embodiment of a cover sheet tab that can include contracting department, original date, expiration date, original expiration date, original term, user signatory, title of user signatory, responsible parties names and titles, description of the contract, contracting site, contracting group, other signatory, title of the other signatory, product related to the contract, and value/rate. The information on the cover sheet tab may differ for different types of documents. Also, even for contracts, the information may differ. As FIG. 25 shows, the system may not include an entry for every one of the pieces of information on the cover sheet. The pieces of information and/or the entries corresponding thereto may provide hyperlinks to additional information as well as to other contracts as described above with respect to the heading region.

As with any of the tabs, clicking on the "EDIT" button in the heading region may provide a user with editing capabilities to alter any of the information in the "cover sheet" information pane. Only users with authorization to edit will see the "EDIT" button. For other users the button will be hidden. Information displayed as a result of clicking on any of the tabs may be editable if desired.

Figure 26:
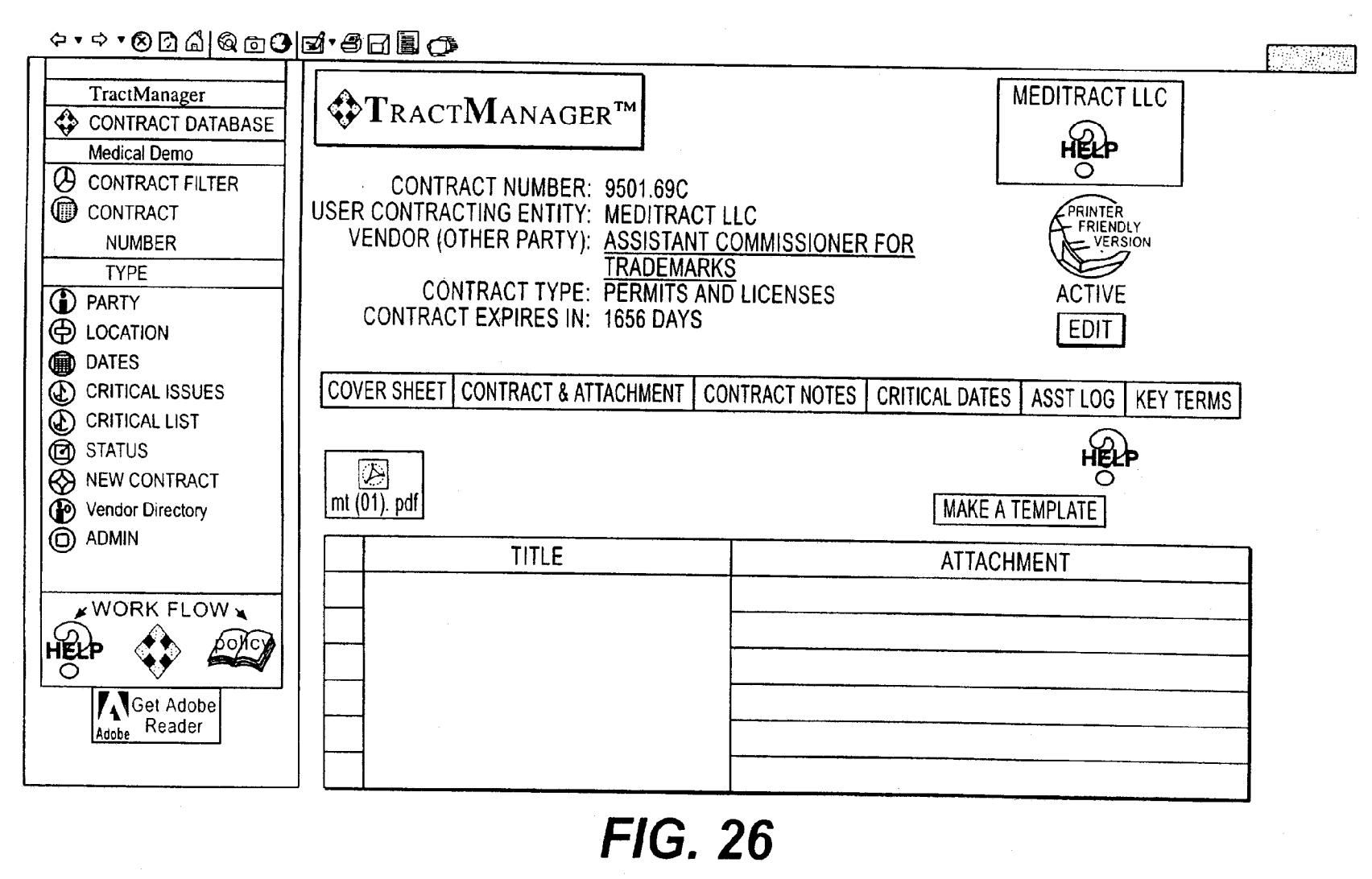

Clicking on the "contract & attachments", or more generically, "document & attachments", tab can result in display of a document information pane that includes the information shown in FIG. 26. The "contract & attachments" tab typically will include a hyperlink to the original document. Clicking on this link will launch both the image copy and the digital version of the document. The form of the document may vary, depending upon the embodiment. Typically, the original document is a "pdf" file readable by Adobe Acrobat version 3.0 or higher available from Adobe Corporation.

The "contract & attachments" tab may also result in the display of addenda, exhibits, attachments, and/or any other material to a document. Any desired material could be attached to a document. Typically, the attachment names are hyperlinks to the attachment. In the EDIT mode, attachments may be added to the tab. The attachments could be in the form of another document that is scanned in or a file on a disk, for example.

The "contract & attachments" tab may provide a button, such as the "make a template" button shown in FIG. 26 that can permit an existing document record to serve as a template for creating another document record. This can expedite and simplify the process of creating document records. If a new document record would share much information with an existing record, there is no reason to require the reentry of all information for the new document record.

Figure 27:
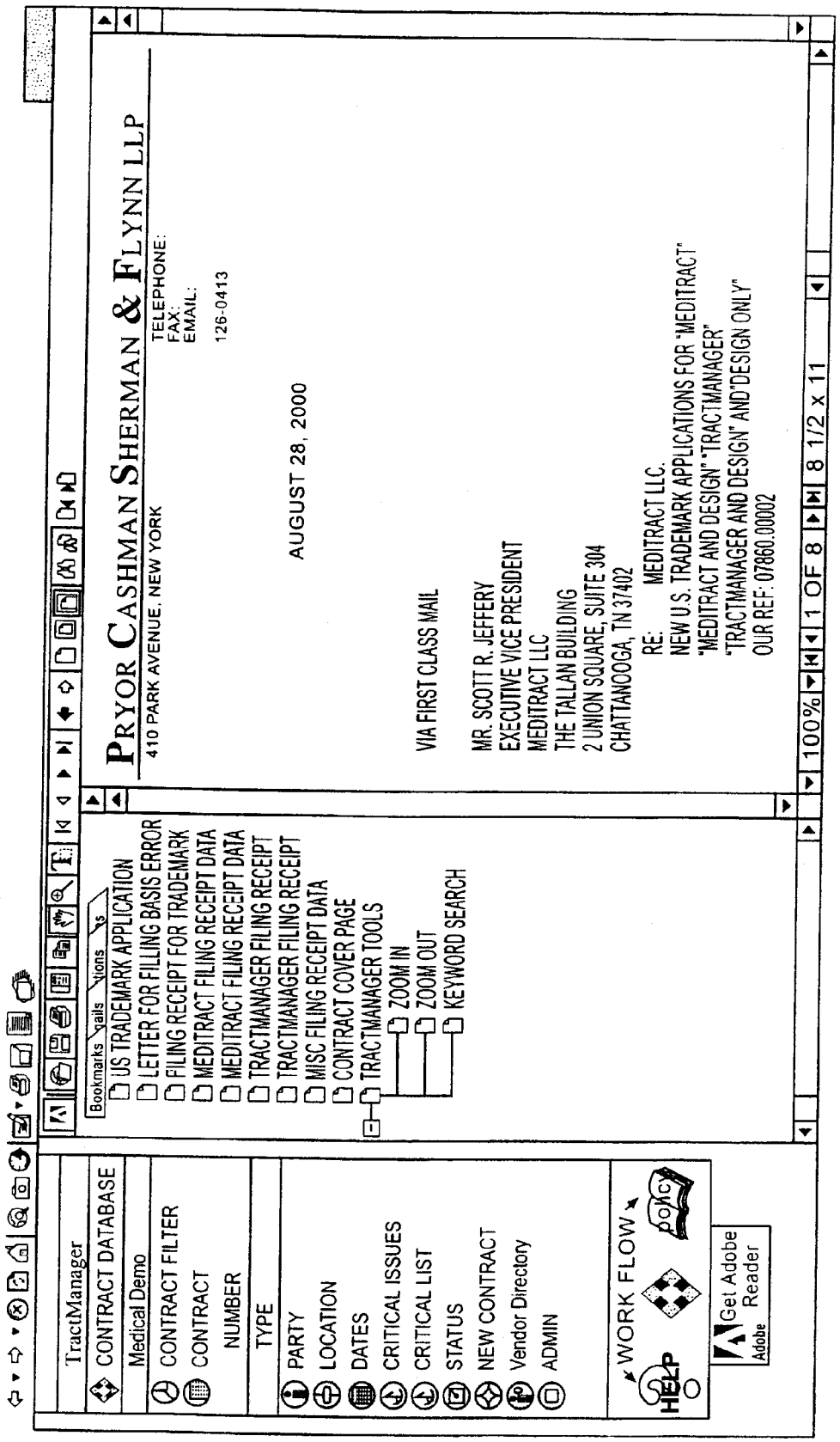
Figure 27:
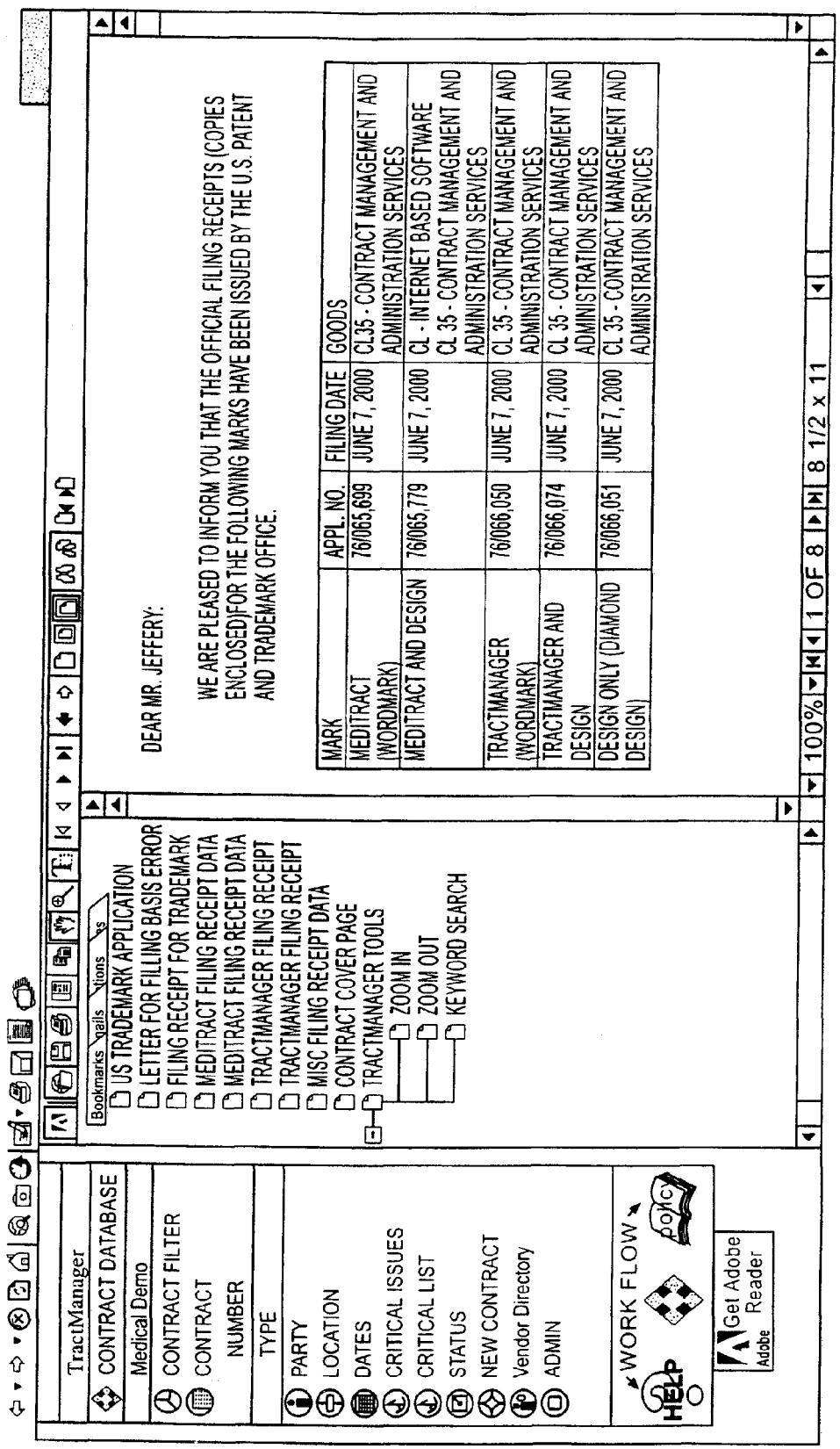
Figure 31:
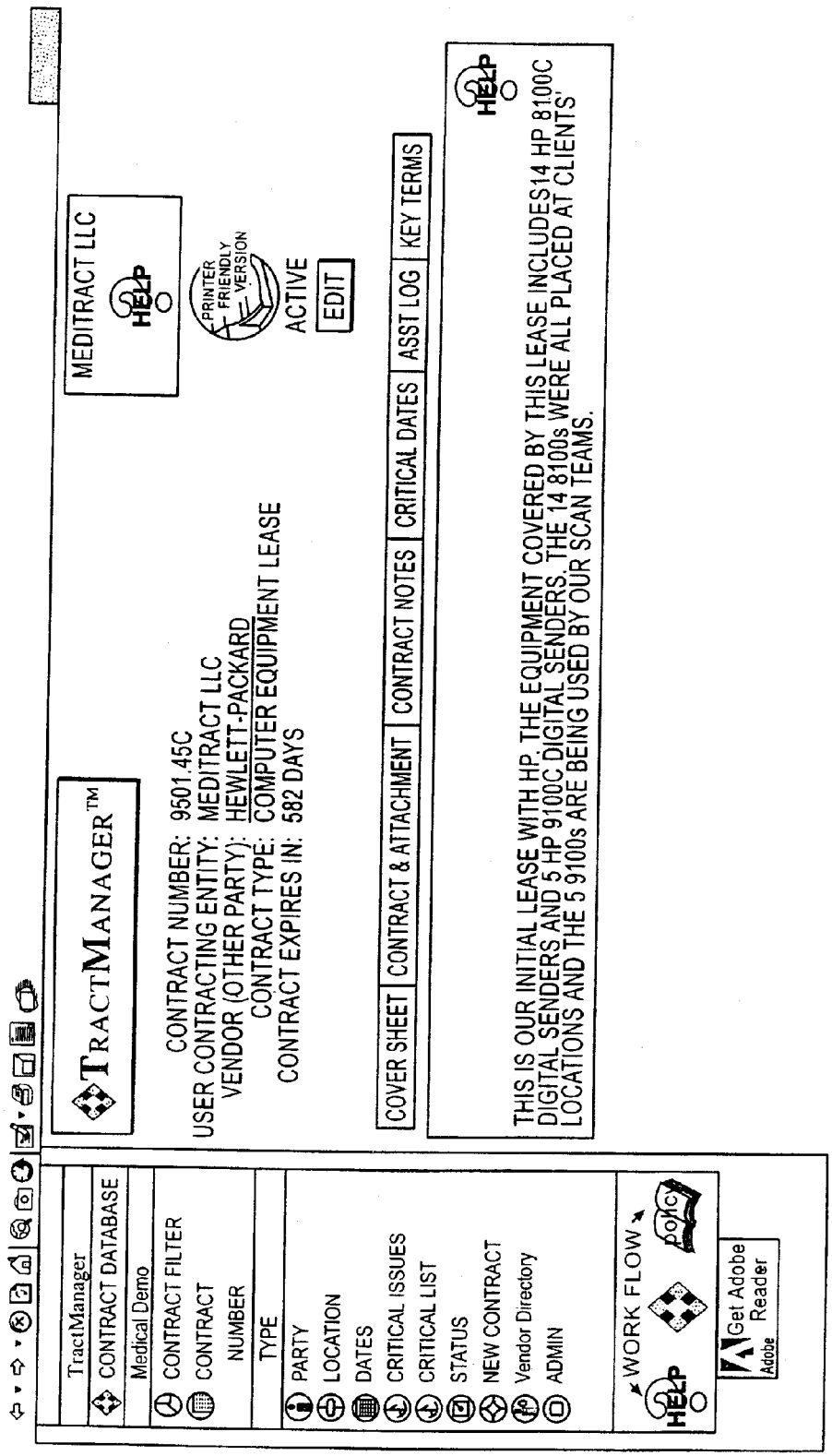

Clicking on the link to the original document will launch both the image copy of the document and the digital version of the document. FIG. 27 provides an example of a scanned image of a document, including a list of bookmarks. Clicking on a bookmark will transport the user to the corresponding region of the text. If the document is a pdf file, all of the search, navigation and manipulation tools available in Adobe Acrobat may be utilized. Since these tools are generally known, they will not be discussed in greater detail herein.

Figure 28:
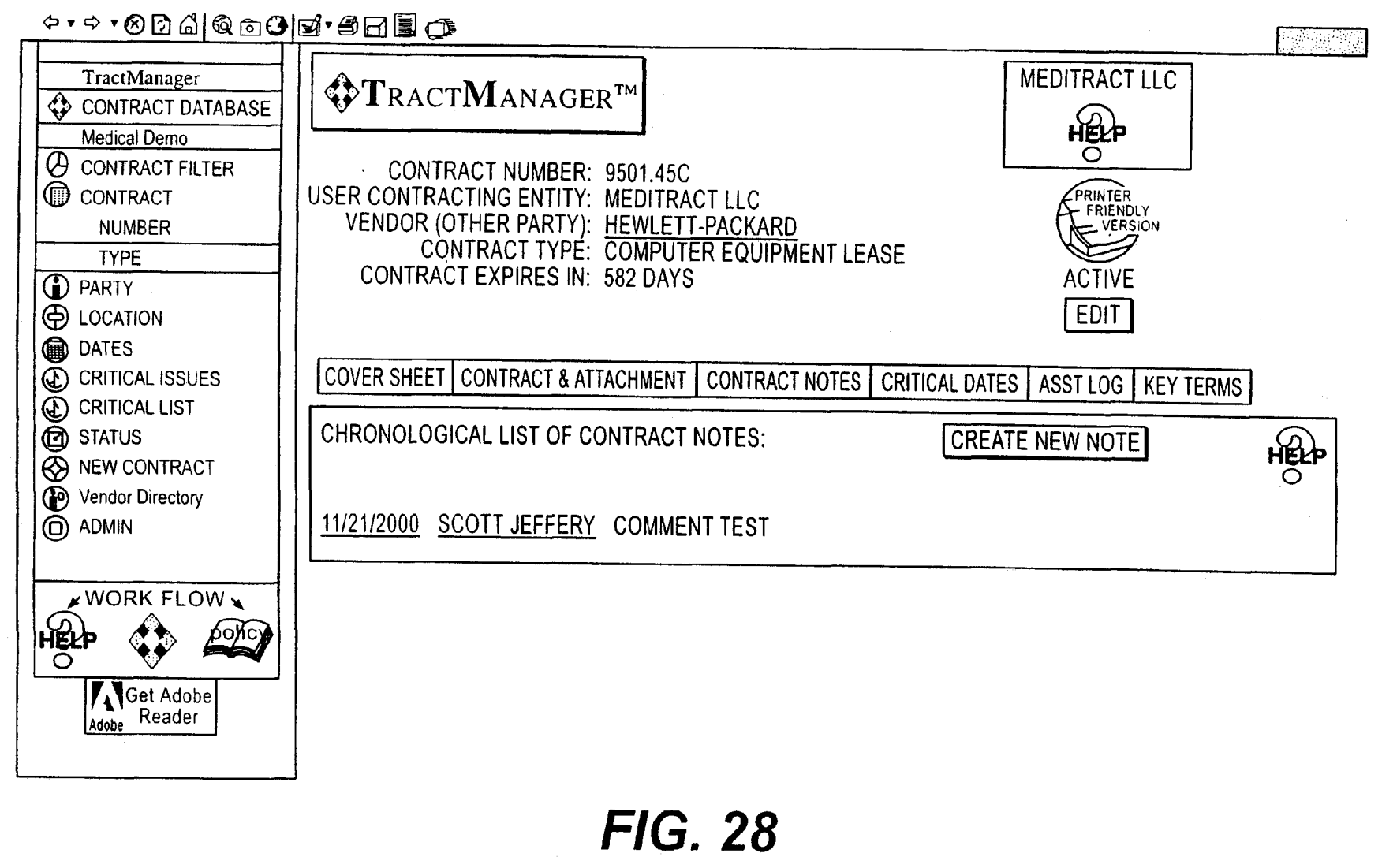

FIG. 28 illustrates an embodiment of a document notes, specifically a "contract notes", information pane. This pane can include links to any notes that may have been created and attached to a document record. The notes may be listed in any order. For example, the embodiment shown in FIG. 28 lists the notes chronologically. The notes could also be listed by creator. Both the date and the creator can provide hyperlinks to a note or to a list of notes. The note could also have an associated title that could be listed and provide a hyperlink to the note. Additionally, the date, creator, or other identifying element could provide a link to a list of notes created on the same date, by the same creator or having the other element in common, respectively. The "document notes" information pane may also provide a link to create a new note.

Figure 29:
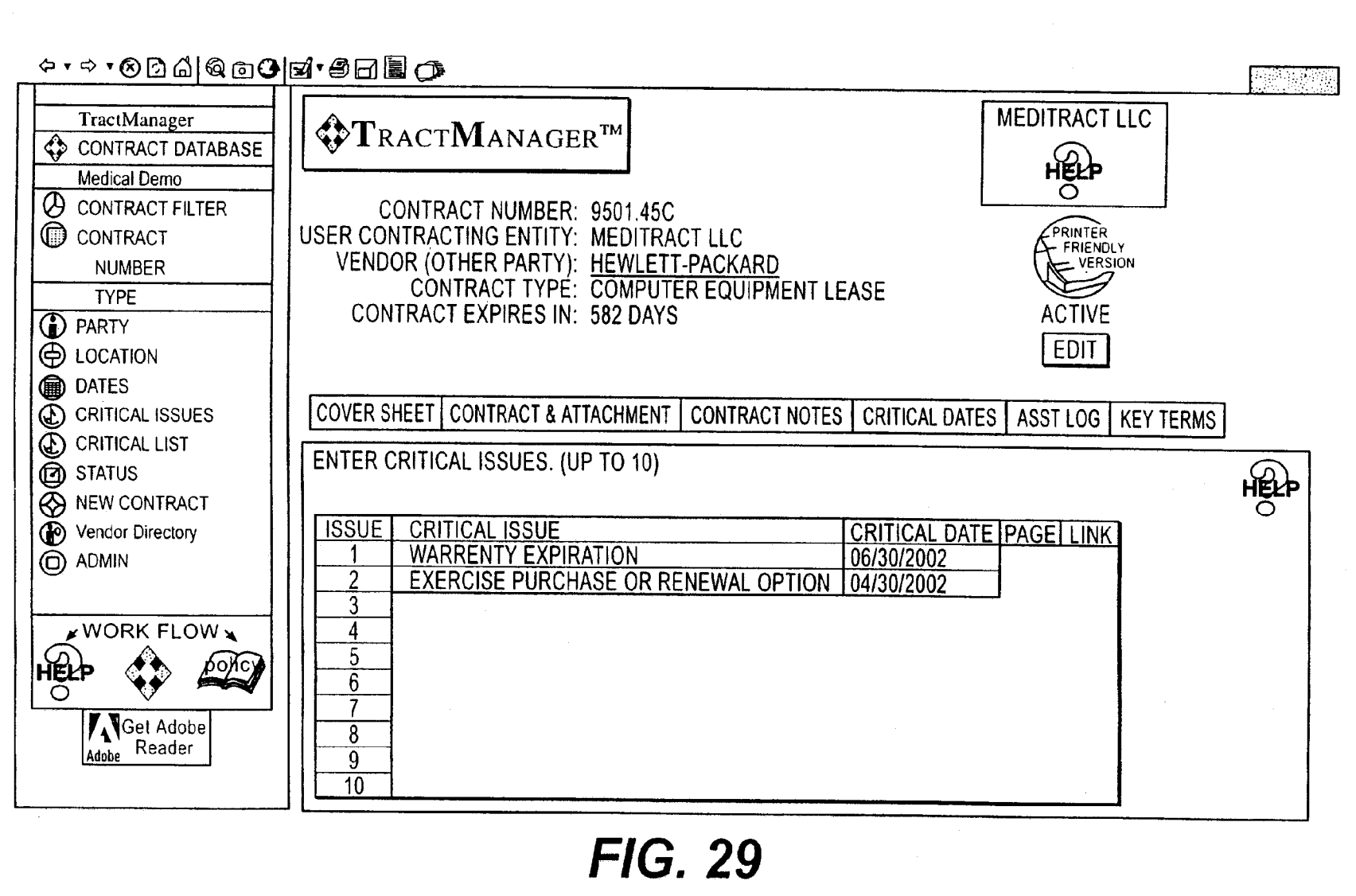

Critical issues, such as dates, associated with a document may be listed in a "critical dates" information pane by clicking on the "critical dates" tab. FIG. 29 illustrates an embodiment of such a pane. As FIG. 29 illustrates, the critical dates pane may list the issue, the associated date, the page of a document relevant to the date, and a link to the relevant language on the relevant page. Alternatively, the link could be to a window that displays relevant language from a document. The issues may be listed alphabetically, chronologically, in order of appearance in a document, or otherwise. The text describing the issue could provide a hyperlink to the relevant portion of the document or to a window as described above. The text could also provide a link to all contacts having a similar issue. Similarly, the date could provide a link to the relevant portion of the document, a window with relevant portions of the document, or to a list of all contracts with critical issues on that date.

Figure 30:
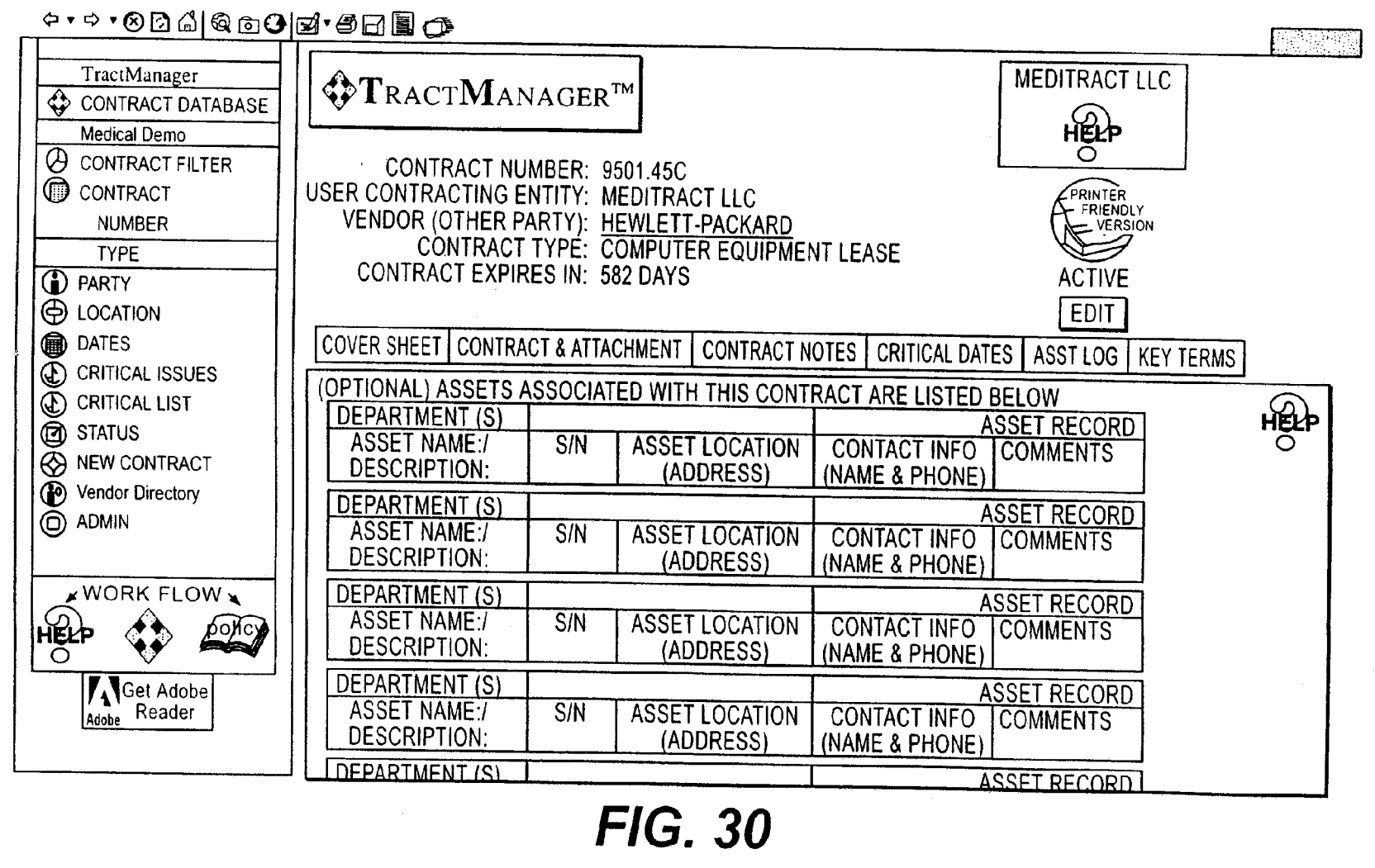

Another tab on the document page could provide information concerning assets related to a document. FIG. 30 illustrates an embodiment of a related "asset log" information pane. Assets may be listed alphabetically by name, numerically by serial number, by address, by contact, or otherwise. In the embodiment shown in FIG. 30, the listing of assets may include asset name and description, asset serial number, asset location, contact information for a party somehow related to the asset, and comments. Each of these headings and/or the information for an asset listed in the heading can provide a link to additional information concerning the asset, to contracts related to the asset, to other assets at the location, to other assets having a common contact, to additional information about an asset or contact, to a relevant portion of the document, or any other information. As with the document note, the asset log could include a clickable button for creating a new asset record to be attached to a document.

Another tab that may be included on a document information page can include a "key terms" tab. The key terms tab can provide a pane that can display selected portions of a document. This can avoid the necessity to retrieve that entire document since the terms may be cut and paste into the key terms pane. The key terms pane may include a link to the document and to the location of the particular text. The edit function can permit a user to add terms to the document record.

The printer friendly version can provide access to a single page containing the information stored on the "summary sheet", "contract and attachments", "critical dates", "asset log", and "key terms" information panes for easy viewing and printing. The information that is included on the printer friendly page can vary, depending upon the system. FIG. 33 represents an embodiment of a printer friendly version of information related to a document that is a contract.

Figure 32:
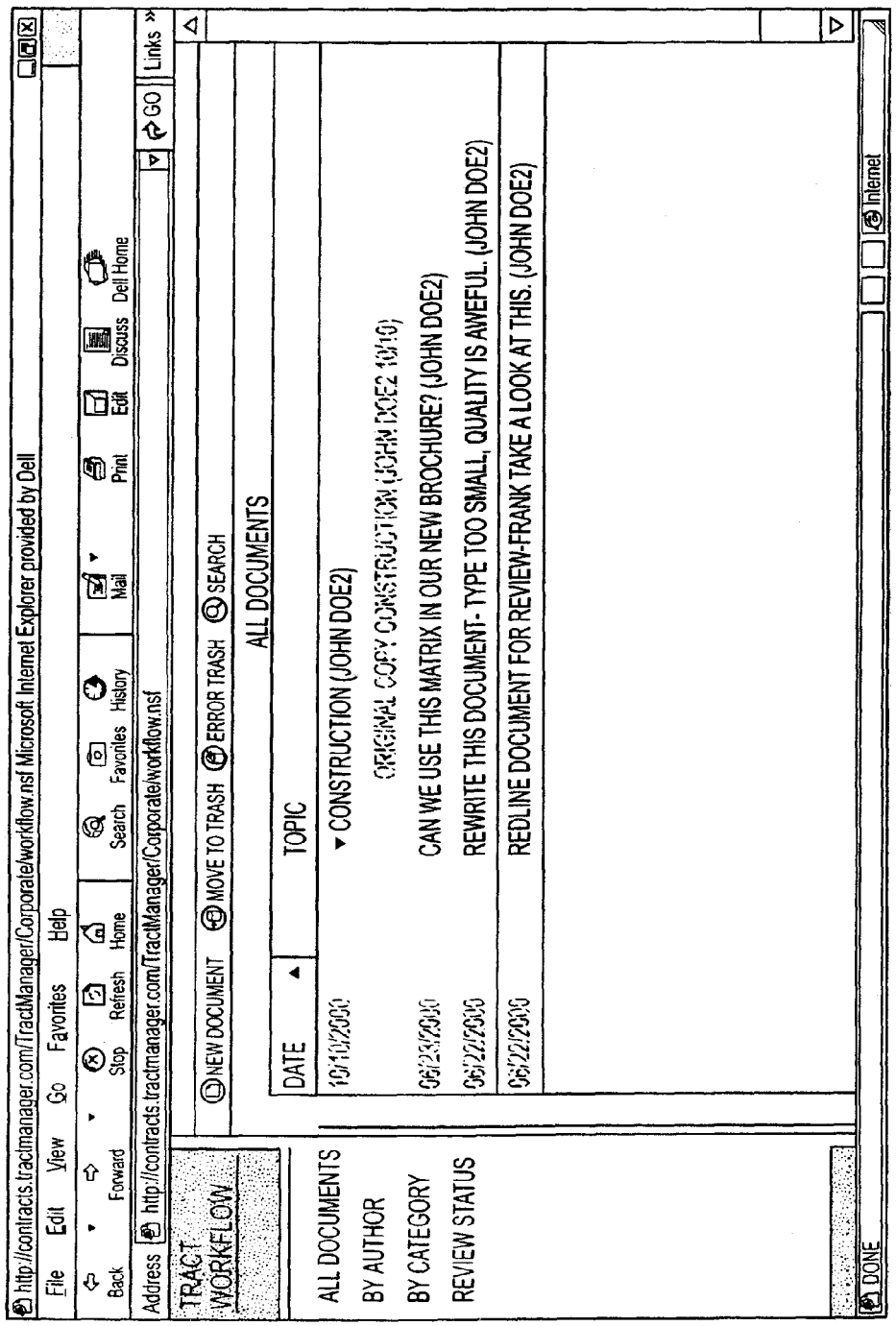
Figure 34:
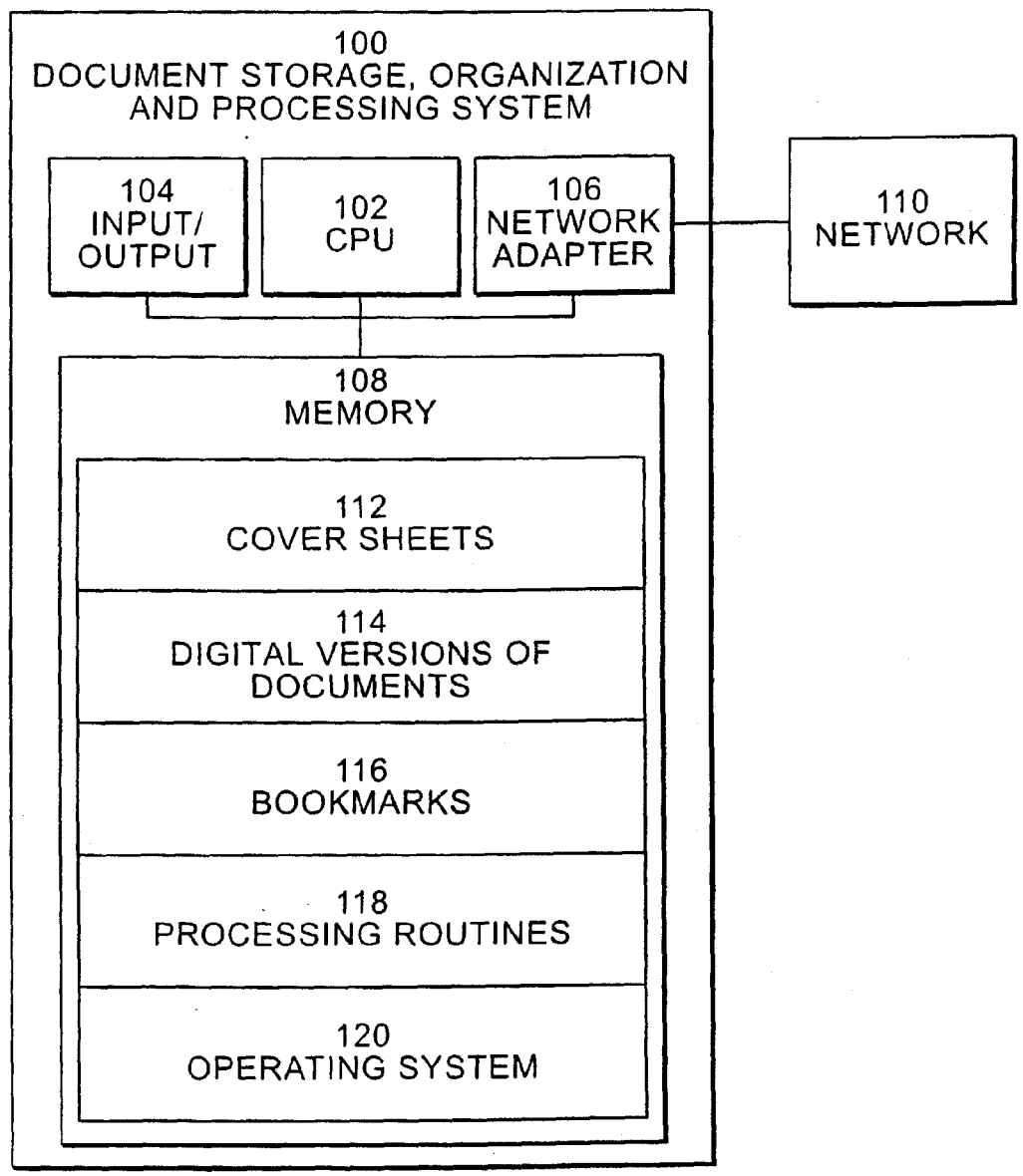
FIG. 34 represents a block diagram that illustrates aspects of a computer system according to the present invention.

As referred to above, a system according to the present invention may include a workflow manager. The workflow manager can permit users to exchange documents in the process of being drafted. The users can include comments on the documents and then forward the comments to other users. FIG. 32 illustrates an embodiment of a workflow manager web page. The workflow manager page shown in FIG. 32 includes a date that action was taken and a listing of topic. The workflow manager can also include links to all documents being handled through the workflow manager, documents by author, documents by category, alternate name, and review status of documents. Clicking on one of the links transports a user to a list of all documents or all documents organized as indicated by the link. The topic and/or date shown in FIG. 32 may also provide links to pages of documents or actions by date, to the particular document referred to by the topic, or to a page that includes information regarding the status of the review, including current, prior and future reviewers, originator of the review, category of the document, and/or any other information. A page concerning a particular review may also include a link to permit attachment of other documents or information of any kind.

Another significant advantage of the present invention relates to the ability to track documents by any relevant characteristic, making it possible to determine the percentage of documents for a particular entity.

An exemplary block diagram of a document storing, organizing and access system 100, according to the present invention, is shown in FIG. 33. A document storing, organizing and access system 100 is typically a programmed general-purpose computer system, such as a personal computer, workstation, server system, and minicomputer or mainframe computer. A document storing, organizing and access system 100 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM® processor, but may also be a minicomputer or mainframe computer processor. Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces transaction processing system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as cover sheet block 112, document digital version block 114, and bookmarks block 116, and a plurality of blocks of program instructions, such as processing routines 118 and operating system 120. Document digital version block 114 stores a plurality of scanned documents and searchable text files that have been received by the document storing, organizing and access system 100. Cover sheet block 112 stores a plurality of cover sheets that may be relevant to one or more documents received by the document storing, organizing and access system. Bookmarks block 118 stores a plurality of bookmarks that may be used to identify portions of the digital versions of the documents. Processing routines 118 are software routines that implement the processing performed by the present invention. Operating system 120 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Among the advantages of the present invention in the context of contract are that it permits managing and monitoring of contract performance. Also, the present invention can help to reduce the cost of doing business and improve control of business. Additionally, through the present invention, contracts or other documents may be tracked and accessed anywhere that Internet access exists. In the context of contracts, the present invention can permit standardization of vendor contracts. Through the creation of a contract or other document database, the present invention can assist in auditing the status of contracts, record activity to a particular contract or contracts, and permit unparalleled access to information. Furthermore, through the control of information that the present invention provides, economies of scale may be realized through consolidation of vendors and efficiencies of internal audits may be improved by ready access to information that did not exist in the past. Still further, the present invention can prevent payment on expired contracts, realize the value of warranties and service agreements and reduce the cost of internal audits.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What we claim is:

1. A method in a computing system of creating a searchable collection of paper documents, wherein the paper documents are separately characterized by document characterization parameters, the method comprising:
   receiving document characterization parameters associated with a plurality of paper documents;
   optically scanning the plurality of paper documents to generate a plurality of digitally-encoded images of the paper documents;

performing optical character recognition on the plurality of digitally-encoded images of the paper documents to generate searchable text corresponding to the plurality of paper documents;

associating the document characterization parameters with the plurality of digitally-encoded images of the paper documents;

storing the document characterization parameters, the plurality of digitally-encoded images, and the searchable text in association with each other as a plurality of digital documents that are organized by a relational database, wherein the plurality of digital documents may be searched by applying a search query against the searchable text or the document characterization parameters in order to identify one or more of the plurality of digitally-encoded images corresponding to paper documents responsive to the search query;

generating a graphical interface to permit a user to search for a digital document and to select a particular digital document; and generating a graphical document summary page for the selected digital document that displays two or more of the received document characterization parameters associated with the selected digital document and allows a user to:

edit the selected digital document;

edit the received document characterization parameters associated with the selected digital document;

add one or more links to notes, wherein the notes are attached to the selected digital document, and wherein each link is displayed in conjunction with a date on which a note was created; and identify other related digital documents that are associated with a common document characterization parameter, wherein the common document characterization parameter is one of the two or more characterization parameters displayed on the graphical document summary page for the selected digital document, wherein the user initiates the identification of the other related digital documents by selecting the displayed common document characterization parameter, and, wherein the other related digital documents are identified by utilizing the relational database.

2. The method of claim 1, wherein receiving document characterization parameters associated with the plurality of paper documents comprises:

receiving a paper definition document containing, in machine-readable form, the document characterization parameters of an associated paper document; and machine-reading the paper definition document to extract the document characterization parameters.

3. The method of claim 1, further comprising:

comparing a first document characterization parameter with a second document characterization parameter; and if the first document characterization parameter matches the second document characterization parameter, associating each of the digital documents associated with the first and second document characterization parameters with each other.

4. The method of claim 1, wherein the plurality of paper documents comprise at least one contract.

5. The method of claim 1, wherein the plurality of paper documents comprise at least one lease, employment contract, purchasing agreement, permit, or article of incorporation.

6. The method of claim 1, further comprising displaying indicia pertaining to the identified one or more digitally-encoded images responsive to the search query.

7. The method of claim 6, further comprising:

receiving a selection by a user of an indicia pertaining to one of the identified one or more digitally-encoded images responsive to the search query; and displaying the selected digitally-encoded image.

8. The method of claim 7, further comprising restricting the display of the selected digitally-encoded image based on the identity of the user.

9. The method of claim 8, wherein the identity of the user is determined by authentication information received from the user.

10. The method of claim 7, further comprising displaying at least some of the document characterization parameters in conjunction with the selected digitally-encoded image.

11. The method of claim 7, further comprising identifying a term in the selected digitally-encoded image that is associated with a second digitally-encoded image corresponding to a different paper document.

12. The method of claim 11, wherein the identified term is hyperlinked to the second digitally-encoded image.

13. The method of claim 1, wherein the search query is specified by a text string.

14. The method of claim 1, wherein the search query is specified by a pull-down menu.

15. A system for creating a searchable collection of paper documents, wherein the paper documents are separately characterized by document characterization parameters, the system comprising:

a receiver for receiving document characterization parameters associated with a plurality of paper documents and a plurality of digitally-encoded images of the plurality of paper documents;

an optical character recognition (OCR) component for performing OCR on the received plurality of digitally-encoded images to generate searchable text corresponding to the plurality of paper documents;

a storage component for storing the received document characterization parameters, the received plurality of digitally-encoded images, and the generated searchable text in association with each other as a plurality of digital documents that are organized by a relational database;

a search component for receiving a search query and applying the search query against the stored searchable text or the stored document characterization parameters in order to identify one or more of the plurality of digitally-encoded images corresponding to paper documents responsive to the search query; and a graphical interface component for:

generating a graphical interface to permit a user to search for a digital document and to select a particular digital document; and edit the selected digital document;

edit the received document characterization parameters associated with the selected digital document;

add one or more links to notes, wherein the notes are attached to the selected digital document, and wherein each link is displayed in conjunction with a date on which a note was created; and identify other related digital documents that are associated with a common document characterization parameter, wherein the common document characterization parameter is one of two or more displayed characterization parameters that are associated with the selected digital document, wherein the user initiates the identification of the other related digital documents by selecting the displayed common document characterization parameter, and, wherein the other related digital documents are idnetified by utilizing the relational database.

16. The system of claim 15, wherein receiving document characterization parameters associated with the plurality of paper documents comprises:

receiving a paper definition document containing, in machine-readable form, the document characterization parameters of an associated paper document; and machine-reading the paper definition document to extract the document characterization parameters.

17. The system of claim 15, wherein the storage component further:

compares a first document characterization parameter with a second document characterization parameter; and if the first document characterization parameter matches the second document characterization parameter, associates each of the digital documents associated with the first and second document characterization parameters with each other.

18. The system of claim 15, wherein the plurality of paper documents comprise at least one contract.

19. The system of claim 15, wherein the plurality of paper documents comprise at least one lease, employment contract, purchasing agreement, permit, or article of incorporation.

20. The system of claim 15, further comprising a display component for displaying indicia pertaining to the identified one or more digitally-encoded images responsive to the search query.

21. The system of claim 20, further comprising a navigation component for receiving a selection by a user of an indicia pertaining to one of the identified one or more digitally-encoded images responsive to the search query; wherein the display component displays the digitally-encoded image pertaining to the selected indicia.

22. The system of claim 21, wherein the navigation component restricts the display of the selected digitally-encoded image based on the identity of the user.

23. The system of claim 22, wherein the identity of the user is determined by authentication information received from the user.

24. The system of claim 21, wherein the display component displays at least some of the document characterization parameters in conjunction with the selected digitally-encoded image.

25. The system of claim 21, wherein the navigation component further identifies a term in the selected digitally-encoded image that is associated with a second digitally-encoded image corresponding to a different paper document.

26. The system of claim 25, wherein the identified term is hyperlinked to the second digitally-encoded image.

27. The system of claim 15, wherein the search query is specified by a text string.

28. The method of claim 15, wherein the search query is specified by a pull-down menu.

29. A computer-readable medium containing instructions for execution on a computer to create a searchable collection of paper documents, wherein the paper documents are separately characterized by document characterization parameters, by:

receiving document characterization parameters associated with a plurality of paper documents;

optically scanning the plurality of paper documents to generate a plurality of digitally-encoded images of the paper documents;

performing optical character recognition on the plurality of digitally-encoded images of the paper documents to generate searchable text corresponding to the plurality of paper documents;

associating the document characterization parameters with the plurality of digitally-encoded images of the paper documents;

storing the document characterization parameters, the plurality of digitally-encoded images, and the searchable text in association with each other as a plurality of digital documents that are organized by a relational database, wherein the plurality of digital documents may be searched by applying a search query against the searchable text or the document characterization parameters in order to identify one or more of the plurality of digitally-encoded images corresponding to paper documents responsive to the search query;

generating a graphical interface to permit a user to search for a digital document and to select a particular digital document; and generating a graphical document summary page for the selected digital document that displays two or more of the received document characterization parameters associated with the selected digital document and allows a user to:

edit the selected digital document;

edit the received document characterization parameters associated with the selected digital document;

add one or more links to notes, wherein the notes are attached to the selected digital document, and wherein each link is displayed in conjunction with a date on which a note was created; and identify other related digital documents that are associated with a common document characterization parameter, wherein the common document characterization parameter is one of the two or more characterization parameters displayed on the graphical document summary page for the selected digital document, wherein the user initiates the identification of the other related digital documents by selecting the displayed common document characterization parameter, and, wherein the other related digital documents are identified by utilizing the relational database.

30. The computer-readable medium of claim 29, further comprising displaying indicia pertaining to the identified one or more digitally-encoded images responsive to the search query.

31. The computer-readable medium of claim 30, further comprising:
   receiving a selection by a user of an indicia pertaining to one of the identified one or more digitally-encoded images responsive to the search query; and
   displaying the selected digitally-encoded image.

32. The computer-readable medium of claim 31, further comprising restricting the display of the selected digitally-encoded image based on the identity of the user.

33. The method of claim 1, wherein the one or more links to notes are displayed in chronological order of the date on which a note was created.

34. The system of claim 15, wherein the one or more links to notes are displayed in chronological order of the date on which a note was created.

35. The computer-readable medium of claim 29, wherein the one or more links to notes are displayed in chronological order of the date on which a note was created.

\* \* \* \* \*

UNITED STATES PATENT AND TRADEMARK OFFICE
CERTIFICATE OF CORRECTION

| | |
|---|---|
| PATENT NO. | : 8,028,231 B2 |
| APPLICATION NO. | : 11/688765 |
| DATED | : September 27, 2011 |
| INVENTOR(S) | : Scott R. Jeffery et al. |

It is certified that error appears in the above-identified patent and that said Letters Patent is hereby corrected as shown below:

On the Title page, in field (57), in column 2, in "Abstract", line 15, delete "internet." and insert -- Internet. --, therefor.

In column 1, line 8, delete "Jun" and insert -- June --, therefor.

In column 8, line 51, delete "check" and insert -- check, --, therefor.

In column 9, line 12, delete "sub options" and insert -- suboptions --, therefor.

In column 9, line 31, delete "sub options" and insert -- suboptions --, therefor.

In column 9, line 34, delete "sub options" and insert -- suboptions --, therefor.

In column 9, line 35, delete "sub options." and insert -- suboption. --, therefor.

In column 11, line 16, delete "auto renewal" and insert -- autorenewal --, therefor.

In column 12, line 37, delete "contact." and insert -- contract. --, therefor.

In column 12, line 42,
below "change." insert -- A document summary page, such as the page shown in Fig. 25, may include a heading region 100 that includes certain pieces of information. The heading in the embodiment shown in Fig. 25 is arranged at the top of the page. However, the information in the heading could be arranged anywhere on the page, such as on the side, or at the bottom as a footer.

The heading may include any selected pieces of information. In the embodiment shown in Fig. 25, the heading includes the contract number, the contracting entity for the user, vendor or party that the contract was made with, the contract type, and the time period left on the contract. The heading region may also include links to on-line help, to a printer friendly version that includes information Signed and Sealed this
Twenty-seventh Day of December, 2011

David J. Kappos
*Director of the United States Patent and Trademark Office* concerning the document as discussed below in greater detail, and to a version of the summary page that permits editing of the information. The summary region can also display the status of the document. This is particularly relevant for any time sensitive documents, such as contracts, warranties, and regulations, among others. --.